US005778388A

United States Patent [19]
Kawamura et al.

[11] Patent Number: 5,778,388
[45] Date of Patent: Jul. 7, 1998

[54] METHOD OF PROCESSING A SYNCHRONIZATION POINT IN A DATABASE MANAGEMENT SYSTEM TO ASSURE A DATABASE VERSION USING UPDATE LOGS FROM ACCUMULATED TRANSACTIONS

[75] Inventors: Nobuo Kawamura, Sagamihara; Kazuo Masai; Nobuyuki Yamashita, both of Yokohama; Hiroshi Nagai, Fujisawa, all of Japan

[73] Assignees: Hitachi, Ltd., Tokyo; Hitachi Software Engineering Company, Ltd., Yokohama, both of Japan

[21] Appl. No.: 529,176

[22] Filed: Sep. 15, 1995

[30] Foreign Application Priority Data

Sep. 19, 1994 [JP] Japan .................................. 6-222930

[51] Int. Cl.⁶ .................................................. G06K 17/30
[52] U.S. Cl. ........................... 707/203; 707/202; 707/2
[58] Field of Search .......................... 395/575, 182.13, 395/600, 602, 618, 182.18; 364/200; 371/12; 707/2, 202, 203

[56] References Cited

U.S. PATENT DOCUMENTS

| 4,507,751 | 3/1985 | Gawlick et al. ........................ 707/2 |
| 4,697,266 | 9/1987 | Finley et al. ...................... 395/182.14 |
| 4,853,843 | 8/1989 | Ecklund .................................. 707/203 |
| 4,945,474 | 7/1990 | Elliott et al. ........................... 364/200 |
| 5,065,311 | 11/1991 | Masai et al. ...................... 395/182.18 |
| 5,175,849 | 12/1992 | Schneider ............................. 395/618 |
| 5,265,245 | 11/1993 | Nordstrom et al. .................... 395/600 |
| 5,317,727 | 5/1994 | Tsuchida et al. ...................... 395/602 |
| 5,319,773 | 6/1994 | Britton et al. ...................... 395/182.13 |
| 5,319,774 | 6/1994 | Ainsworth et al. .................... 395/575 |
| 5,333,303 | 7/1994 | Mohan ................................... 395/575 |
| 5,333,314 | 7/1994 | Masai et al. ........................... 395/618 |
| 5,465,328 | 11/1995 | Dievendorff et al. .............. 395/182.13 |

OTHER PUBLICATIONS

Mhan et al., "Aries: A Transaction Recovery Method Supporting Fine-Granularity Locking and PartialRollbacks Using Write-Ahead Logging", ACM Transactions on Database Systems, v.17 n1, pp. 120-131, Mar. 1992.

Primary Examiner—Thomas G. Black
Assistant Examiner—Charles Rones
Attorney, Agent, or Firm—Antonelli, Terry, Stout & Kraus, LLP

[57] ABSTRACT

In a database management method and a database management system in which transactions need not be stopped at a synchronization point (syncpoint) acquired at a fixed interval of time. when a point to acquire a syncpoint is reached in a database control procedure. a syncpoint acquisition start log is output and then a syncpoint acquisition flag is set ON in a page control table of each updated page existing in a buffer pool. In the operation, a list of update page control tables is also created to write in the database the pages which are indicated in the list thus prepared. However, for a transaction accessing the pertinent updated page prior to the write operation thereof in the database, the data write operation is performed before the page is referenced, thereby enabling the access to be performed to the database without interrupting the transaction.

13 Claims, 23 Drawing Sheets

FIG. 4

| NUMBER OF ALLOCATED SLOTS | NUMBER OF USED SLOTS | LENGTH OF AVAILABLE AREA | OFFSET OF FIRST POSITION OF UNUSED AREA | LSN |
|---|---|---|---|---|
| 421 | 422 | 423 | 424 | 425 |

METHOD OF PROCESSING A SYNCHRONIZATION POINT IN A DATABASE MANAGEMENT SYSTEM TO ASSURE A DATABASE VERSION USING UPDATE LOGS FROM ACCUMULATED TRANSACTIONS

BACKGROUND OF THE INVENTION

The present invention relates to a method of processing a synchronization point, or syncpoint, of a database in a database management system in which data items to be accessed from a plurality of transactions are stored.

In a database management system in a multiprocessing environment, there is established a point of confirmation called a "syncpoint" or "checkpoint" at a fixed interval of time during execution of programs for the following reasons. When the database restart recovery is required due to a system failure, the database is restored to a state at a syncpoint of time immediately before occurrence of the failure to restart the interrupted processing, thereby achieving restoration of the database. Syncpoints can be established or determined in an asynchronous manner with respect to progress of a transaction process including update operations of the database. In this connection, the syncpoint indicates a point where the contents of the database are synchronized with the system execution state.

A database management system, particularly a relational database management system, includes logically hierarchic resources such as a database, a schema, a table, a tuple or row. When storing rows physically on a magnetic disk as a nonvolatile storage, each row is physically written in a fixed-length unitary area called "block", or "page". During a transaction process, the database is accessed in the page unit via a buffer pool reserved in a main storage.

For a transaction, pages which are necessary to process the transaction are read from the database such that retrieval and update operations are carried out in the buffer pool. To decrease overhead time due to input and output operations of external storages such as magnetic disks, the system controls the pages to be maintained for a possibly long period of time in the buffer pool. For an update operation of the database during a process of a transaction, information of the updated history thereof is saved in a log. The log is recorded in a permanent fashion in a nonvolatile storage, e.g., a nonvolatile external storage. Each log record is first written in a volatile log buffer in a main storage related to a processor. When the transaction is logically confirmed or determined, the log record is moved therefrom to the external storage. On this occasion, the update of pages in the buffer pool achieved for the transaction is required to be forced in the database in the external storage.

There exists a method of forcing all pages of the buffer pool which are updated due to the transaction in the external storage when the transaction is committed. This method is attended with write overhead time to store the pages in the external storage. To overcome this difficulty, there has been known another method in which the updated pages of the buffer pool are forced in the database in the external storage with an appropriate delay relative to with determination of the transaction. Namely, an identical page updated by a plurality of transactions is written in the external storage. This consequently minimizes the write overhead time to store the pages in the external storage at determination of the transaction.

When the updated page is written in the external storage with a delay of time after determination of the related transactions as described above, if a system failure or the like occurs and the database system is resultantly terminated before the updated page is stored in the external storage, the contents or information of the page will be lost. In this situation, it is necessary to execute an operation of a database system restoring operation to guarantee the state of the transactions executed up to the termination point of the database system. When a system failure occurs before a transaction is committed, all pages undergone update operations related to the transaction are restored to the original states respectively thereof. Moreover, when the system failure occurs after committing the transaction, all update operations associated with the transaction are required to be guaranteed.

When restarting the system, for all transactions processed prior to the previous syncpoint, log records thereof are read from the log file in the external storage so as to recover the transactions. In the transaction recovery according to log records, there may occur a committed transaction in which the actually updated page thereof in the buffer pool is not reflected in the external storage in some cases. In such a situation, the pages to be recovered are again transferred from the database in the external storage to the buffer pool to perform the update process again according to log records associated therewith (REDO).

There may exist a converse case in which the results of update operations of a determined or determinate transaction and an indeterminate transaction in the buffer pool have already been forced in the external storage. To cope with this difficulty, there is provided a log sequence number (LSN) for a log record at the occurrence of an update operation in a page. When a page is updated due to a transaction, a log record is created with a log sequence number written in the page. Due to the provision, the page updated in the buffer pool for the transaction and written in the external storage indicates a log record in the external storage, the log record being related to the last update operation performed due to the transaction. Consequently, it is unnecessary to recover all updated pages as the possible objects of restoration when the system is to be restarted.

When an update objective page is read in the buffer pool, the log sequence number thereof is compared with that of the pertinent log record. If the sequence number of the page (the page's LSN) is larger, it is indicated that update information recorded in the log record has already been reflected in the external storage. In other words, only when the page's LSN is less than that of the log record, the update operation is required to be again performed (REDO) using the log record. It is favorable to possibly reduce the period of time required for the restart operation in the database management system. For this purpose, the re-update or REDO process is to be desirably minimized in the restart process. Consequently, at an appropriate point of time, the pages updated in the buffer pool are ordinarily saved in the database in the external storage by a system process running in the background environment.

In the restoration of pages beginning at the previous syncpoint in the restart process, it is assumed that the restoration is possible according to the state of the database at the immediately preceding syncpoint. For this purpose, the process of establishing a syncpoint is initiated by acquiring a syncpoint start log, i.e., a log record obtained when the first syncpoint is decided. Thereafter, the processing of the transaction is stopped and then the log record in the log buffer is written in the log file in the external storage.

After the log record is completely stored in the log file, all pages updated in the buffer pool are written in the database in the external storage. Thereafter, a log record indicating completion of syncpoint acquisition is stored in the log buffer and then the interrupted transaction process is resumed, thereby completing the syncpoint establishing operation. With this provision, the state of the database at the established syncpoint is guaranteed. Consequently, even when the execution of the system operation is stopped due to a system failure or the like before the subsequent syncpoint is determined, it is possible to restart the system execution beginning at the established syncpoint.

In the process of syncpoint acquisition, the execution of the transaction is temporarily interrupted when the syncpoint acquisition is started as described above. This consequently leads to a problem that the throughput of transactions is temporarily lowered during the process of syncpoint acquisition. Accordingly there exists a method of continuously executing the transaction process also during the syncpoint acquisition in which the page number and log sequence number are written in the log file for each page updated in the buffer pool. In this method, when the system restart recovery process is to be executed, a retrieval operation is carried out through log data having an update page number obtained at the previous syncpoint so as to attain the oldest log sequence number. The system restart process is then achieved according to a log record having the oldest log sequence number. However, at the syncpoint acquisition, when there exists a page in the buffer pool which is maintained therein for a long period of time after the page was previously written in the database in the external storage, the log records to be re-updated by REDO are increased in number. This makes it necessary to minimize the period of time required for the restart process.

These conventional technologies have been described in detail in pages 94–162. (especially pp. 120–131) of "ARIES: A Transaction Recovery Method Supporting Fine-Granularity Locking and Partial Rollbacks Using Write-Ahead Logging" written by C. Mohan and Don Haderle in ACM Transactions on Database Systems, Vol. 17, No. 1 published in March 1992. Moreover, the technologies have been described in detail in the JP-A-5-6297 entitled "Transaction Processing Method and System".

SUMMARY OF THE INVENTION

It is therefore an object of the present invention to retain throughput of the transaction process even during the syncpoint acquisition process.

Another object of the present invention is to provide a method for reducing the time elapsed in the system restart process when restarting the system operation.

Still another object of the present invention is to provide a method for simultaneously accessing an updated page existing at the initiation of the syncpoint acquisition and a page that is not updated in the buffer pool even during the syncpoint acquisition.

In a database management method according to an aspect of the present invention, to obtain a syncpoint in a database management system for enabling a transaction process for which a restart and restore process is supported at occurrence of a system failure, a mark indicating that the syncpoint acquisition is in process is stored in a table controlling all updated pages in a buffer which is mapped onto a main storage but is not written in a database in an external storage at initiation of the syncpoint acquisition.

During the syncpoint acquisition process, updated pages in the buffer thus marked are written in the database. For a transaction which updates an updated page in the marked buffer, the updated page is written in the database before any access thereto. The access is allowed after the mark is released. When all pages of the marked buffer are written in the database, it is assumed that the syncpoint acquisition is finished. Thanks to the operation described above, the transaction process can be continued even during the syncpoint acquisition process.

To achieve the first object, according to the database management method of the present invention, when a plurality of transactions respectively access the database to load pages related thereto in the buffer pool and conduct update operations for the associated pages, when there appears a point of syncpoint acquisition, a mark indicating that the syncpoint acquisition is in progress is stored in a table managing each buffer corresponding to a page updated in the buffer table. According to provision of the mark, any process which writes data in the database in the background job conducts the data write operation in the database in the external storage for the page corresponding to the buffer thus marked in the buffer pool. Therefore, the write operation in the log file can be synchronized with the write operation of an updated page in the database corresponding to log data at acquisition of a syncpoint.

During the syncpoint acquisition, for an access request to a page stored in the marked buffer, the page is once moved from the buffer pool to the database in the external storage and then the access is allowed. Consequently, even during the syncpoint acquisition, the transaction process execution continues and the system throughput is retained at the inherent level.

Other objects, features and advantages of the present invention will become apparent from the detailed description of the embodiments of the invention in conjunction with the accompanying drawings.

BRIEF DESCRIPTION OF THE DRAWINGS

FIG. 4 is a diagram showing the layout of control information items in the page of FIG. 3;

DESCRIPTION OF THE PREFERRED EMBODIMENTS

Description will be now given in detail of an embodiment of the present invention with reference to the accompanying drawings.

Figure 2:
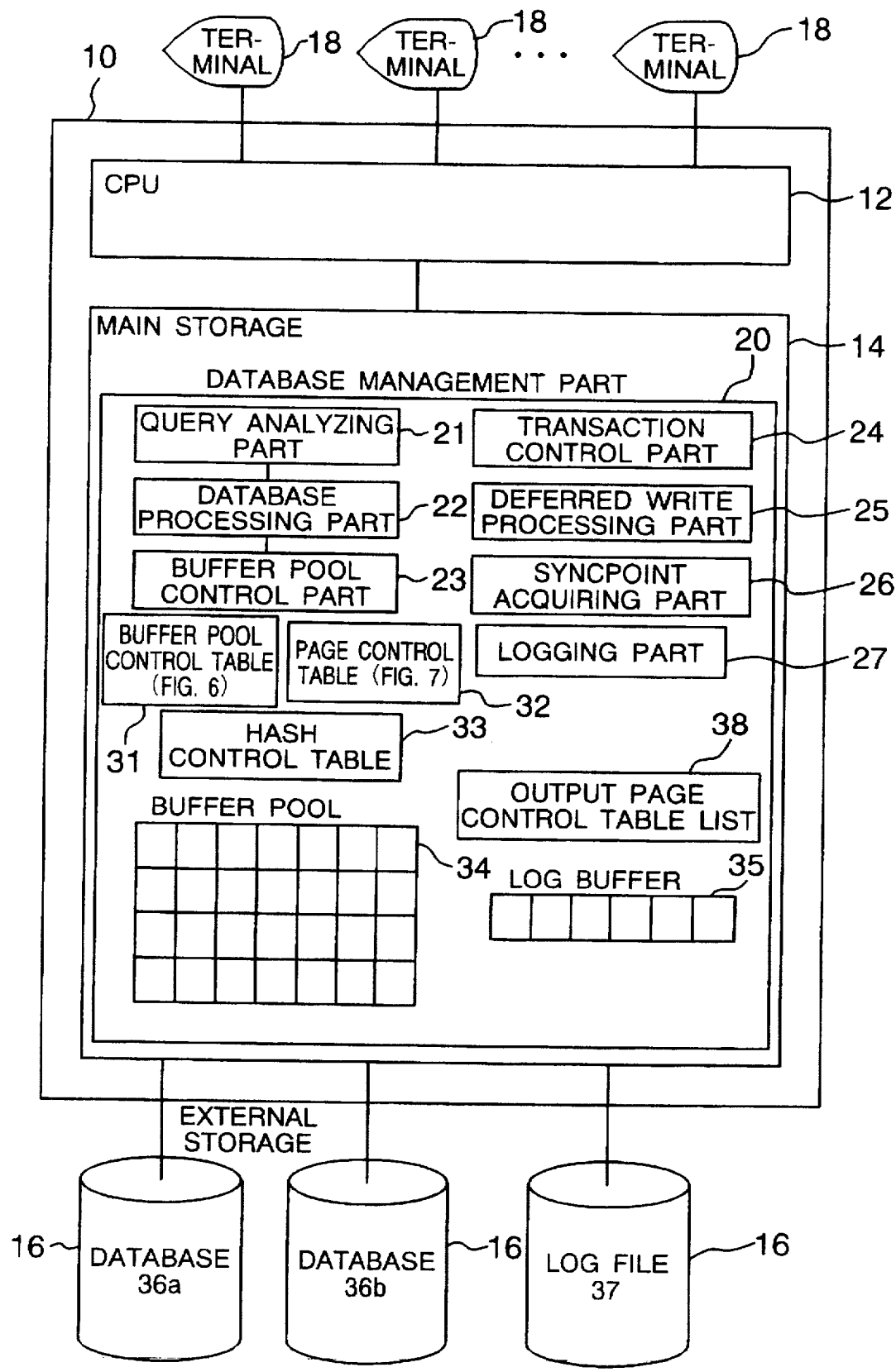
FIG. 2 is a diagram showing the constitution of a database management system to which the present invention is applied.

FIG. 2 shows the structure of a computer system 10 according to an embodiment of the present invention. The computer system 10 includes a central processing unit 12, a main storage 14, external storages 16, and a large number of terminals 18. Stored in the main storage 14 is a database management system 20. The external storages 16 are used to respectively store therein databases 36a and 36b controlled by the database management system 20 and a log file 37 to store therein information of updated history related to database update operations.

Figure 12:
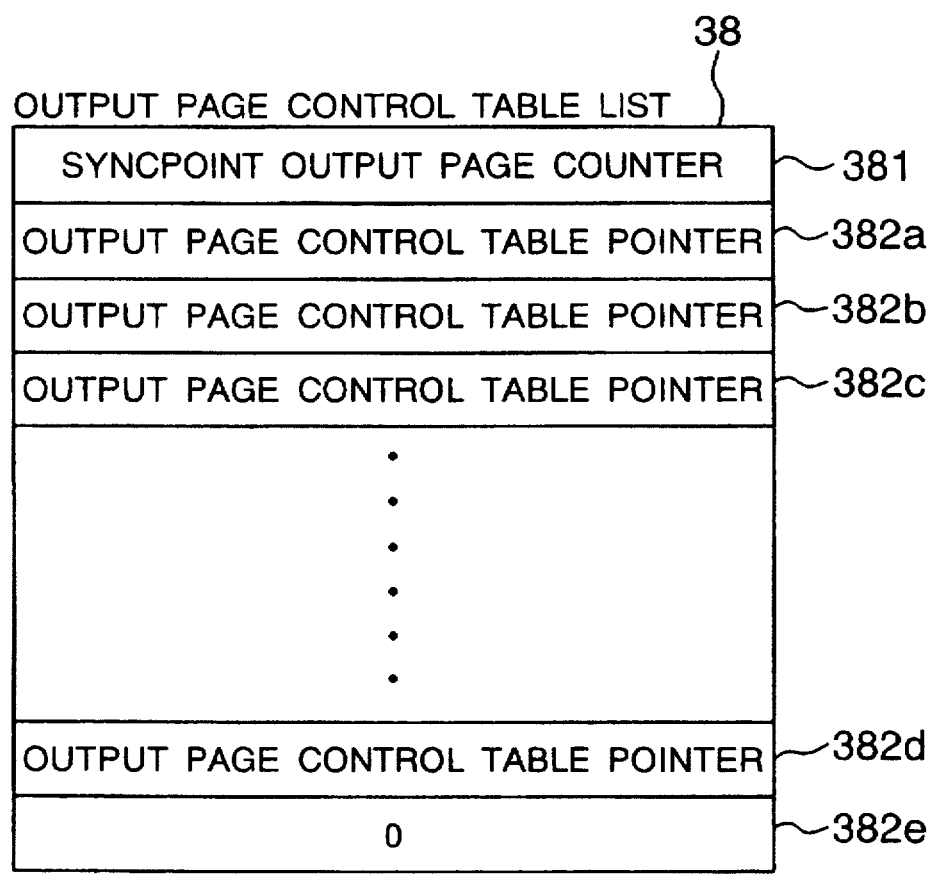
FIG. 12 is a diagram showing structural information of an output page control table list.
Figure 13:
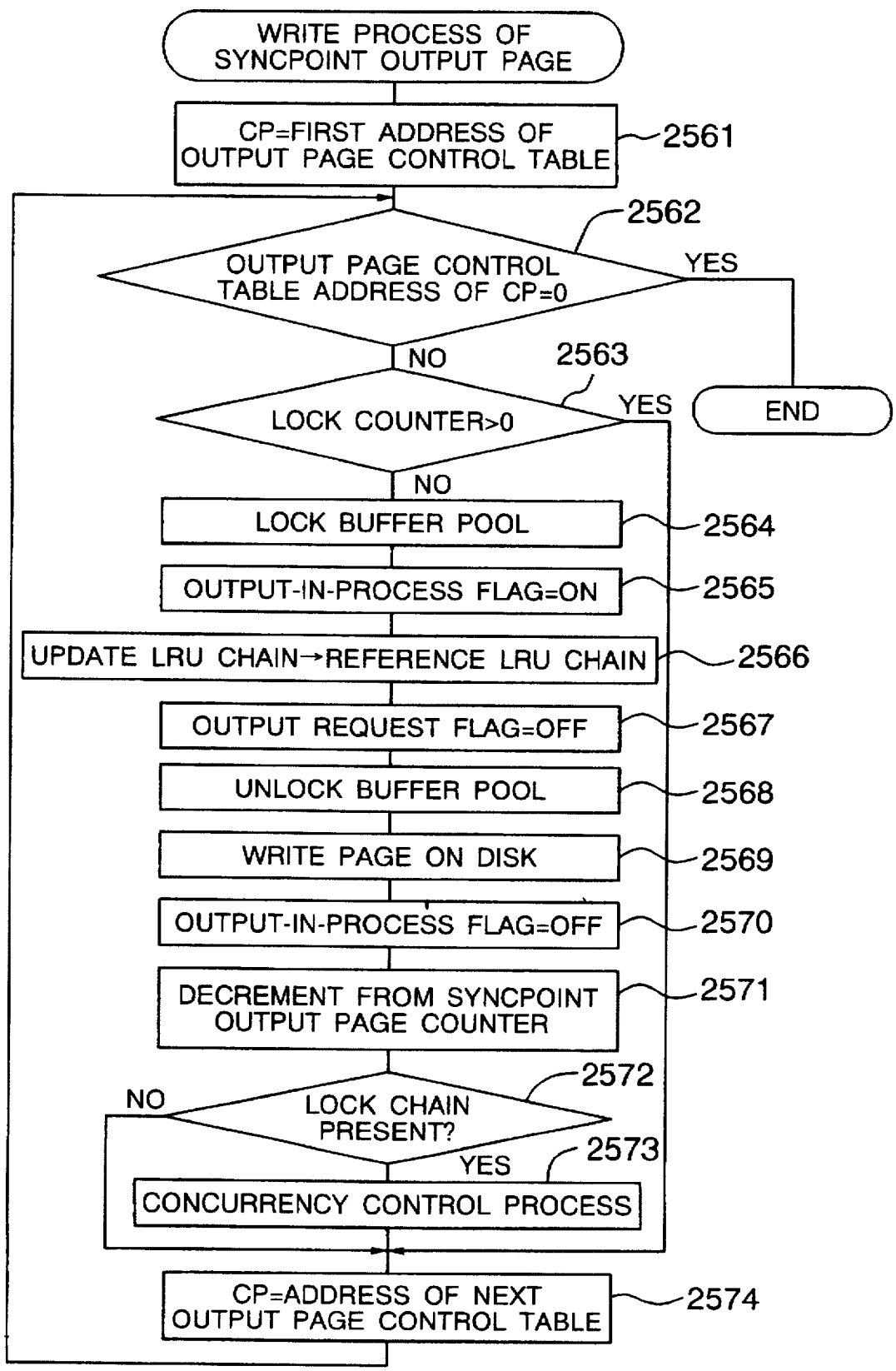
FIG. 13 is a flowchart showing the operation of a write process of a syncpoint output page.

The database management system 20 includes a query analyzing part 21 for receiving a database queny request in a structured query language (SQL) from a user, conducting an optimizing process through a syntactic analysis to determine an optimal access route for a database access, and generating an internal processing code for the processing of the database according to the determined access route, a database processing part 22 for accessing the database according to the internal processing code thus created, a buffer pool control part 23 for communicating data between the databases 36 (36a and 36b) stored in the external storages 16 and a buffer pool 34 reserved in the main storage 14, a transaction control part 24 for controlling transactions input from the terminals 18, a deferred write processing part 25 for writing the updated data of the buffer pool 34 in the database 36 in the external storage 16 in an asynchronous manner with respect to transactions, a syncpoint acquiring part 26 for guaranteeing an operation to periodically set the databases to an integral state, a logging part 27 for controlling a log including historical information of database update operations conducted for transactions (to be simply referred to as "log" herebelow), assigning a log sequence number (LSN) to each log record, and obtaining data from a log buffer 35 in the main storage 14 at termination of each transaction and thereby writing the data in the log file 37 in the external storage 16, and an output page control table list 38 (FIG. 12). The buffer pool control part 23 includes a buffer pool control table 31, a page control table 32, and a hash control table 33 for controlling the buffer pool 34 reserved in the main storage with correspondences established between the pool 34 and physically fixed-length pages as units of accumulation of data in the databases.

Figure 3:
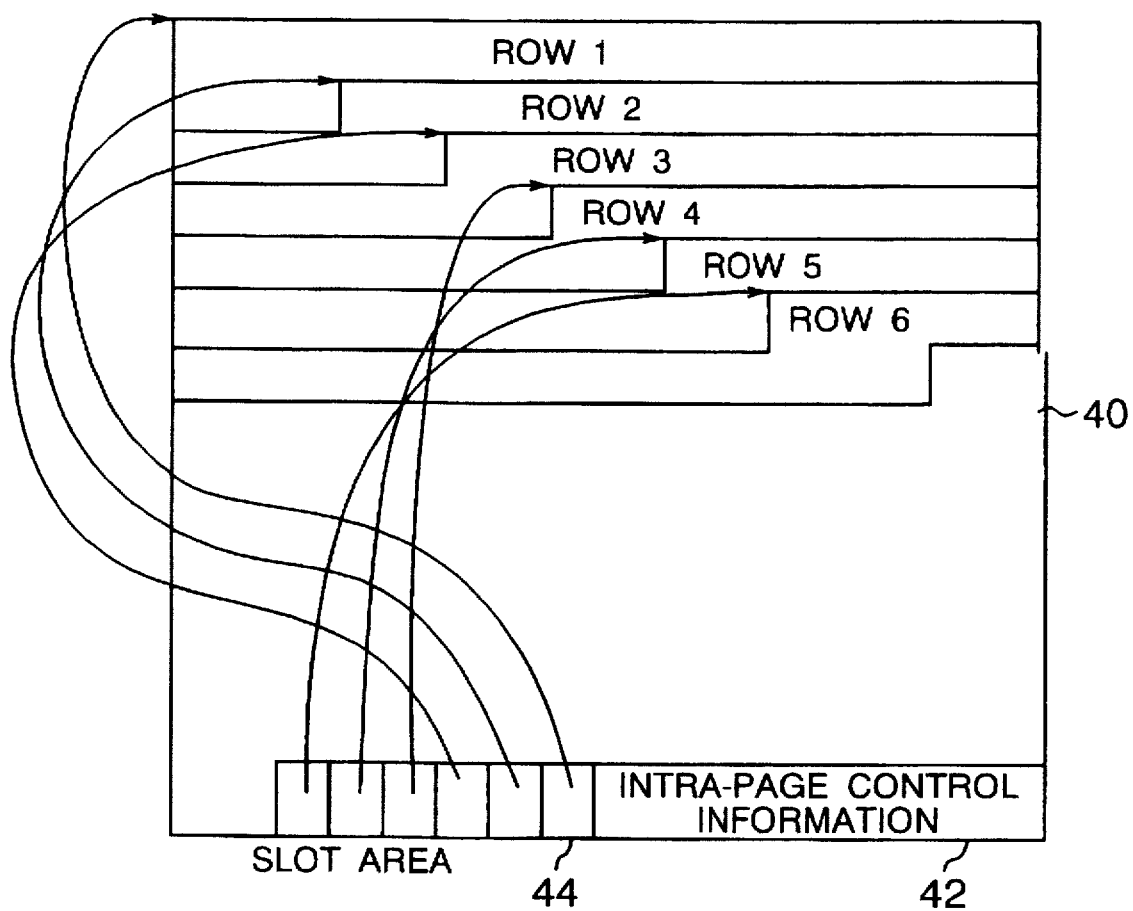
FIG. 3 is a diagram showing the structure of a page in a database.

FIG. 3 shows the constitution of a page 40 as the input/output unit of the databases described above. In a database management system, particularly, in a relational database management system, data is represented in a table format called "relation" including a plurality of rows. A relation is subdivided into a plurality of physically fixed-length pages as input/output units of the database management system 20. The pages are stored in the database 36 in the external storage 16. Stored in each page 40 are rows such that the state in the page is controlled by intra-page control information 42. Rows 1 to 6 thus stored are indicated respectively by intra-page relative addresses stored in a slot area 44.

FIG. 4 shows control information contained in the intra-page control information field 42 of FIG. 3. The information 42 includes a number of allocated slots 421 indicating the number of slots assigned to the page, a number of used slots 422 denoting the number of slots used for the actually stored rows, a length of available area 423 for controlling the length of the available area in the page, an offset of first available area 424 for controlling the first position represented by a relative address of the unused area in the page, and a log sequence number (LSN) 425 of a log in which update operations conducted in the page are reflected. The LSN 425 set before the data of the database 36 when the data is read in the buffer pool 34 indicates that all logs up to the log having LSN 425 are completely reflected in the database 36. On the other hand, when a row is updated in a page in the buffer pool 34, an LSN of a log related to the update is written in the LSN field 425. When the data of the buffer pool 34 is written in the database 36, it is guaranteed that the update indicated by the LSN is reflected in the database 36. It is to be appreciated that the log is written in the log file 37 according to the known write ahead logging (WAL) protocol before the data of the buffer pool 34 is written in the database 36.

Figure 5:
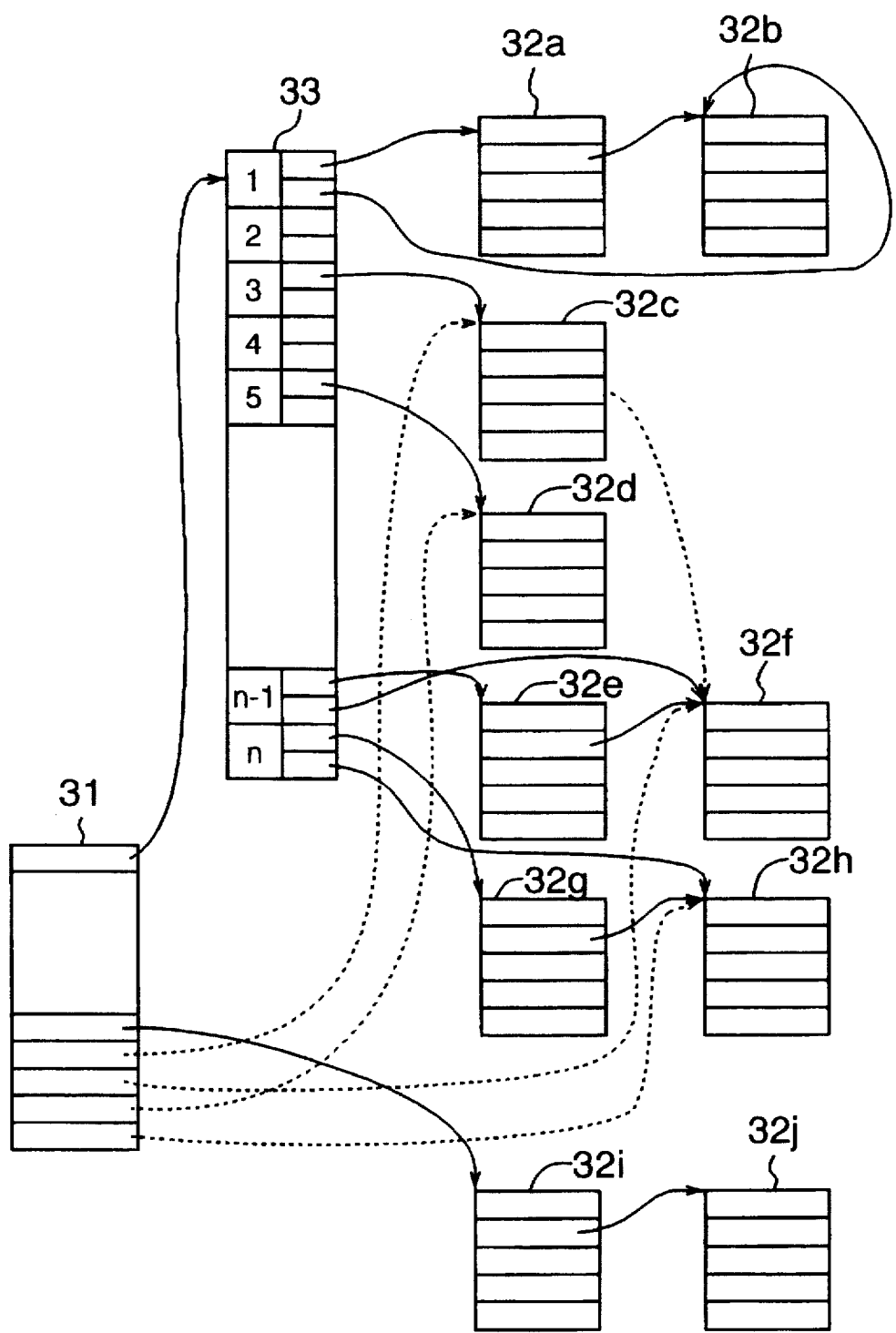
FIG. 5 is a diagram showing the structure of tables controlling a buffer pool of FIG. 2.
Figure 6:
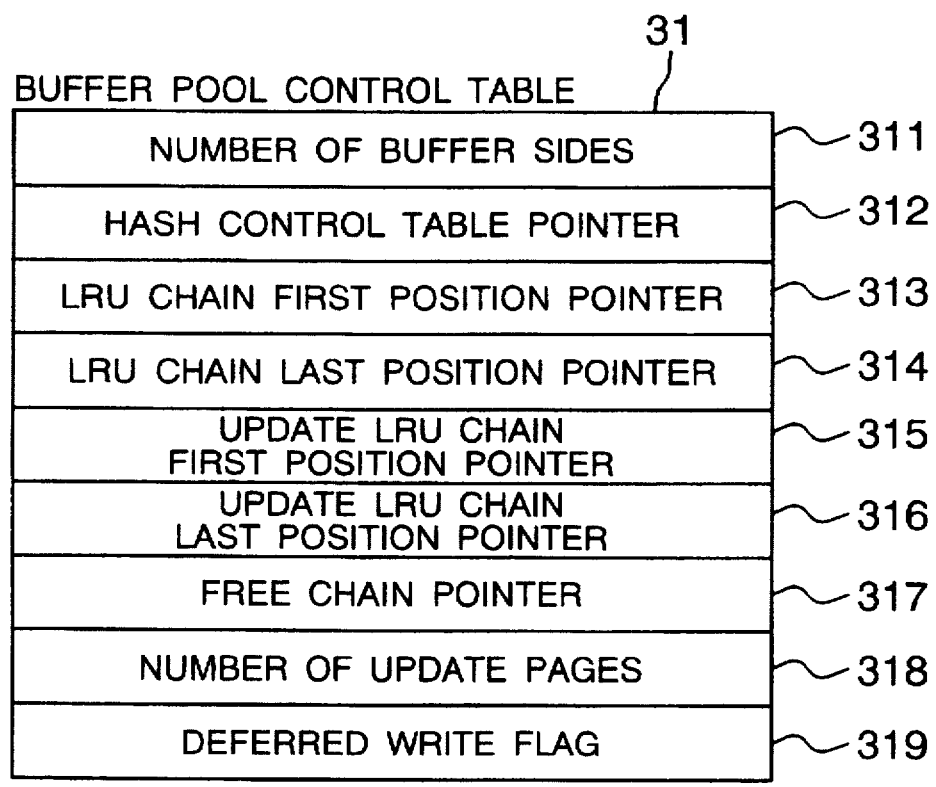
FIG. 6 is a diagram showing structural information of a buffer pool control table of FIG. 2.

FIG. 5 shows relationships between tables to control the buffer pool 34. According thereto, the buffer control part 23 conducts input/output operations of the database 36. The buffer pool control table 31 controls the hash control table 33 and page control table 32. The buffer pool control table 31 includes information items as shown in FIG. 6, namely, a number of buffer sides 311 indicating the number of pages possessed by the buffer pool 34, a pointer 312 to the hash control table 33, a pointer 313 to a page control table 32 controlling the latest page in a least recently used (LRU) chain according to an LRU algorithm as a control method to possibly elongate the period of time in which the pages are kept in the buffer pool 34, a pointer 314 to a page control table 32 controlling the oldest page, a pointer 315 to a page control table 32 controlling the latest page to control another LRU chain of pages updated in a separate fashion as compared with the pages in the LRU chain described above, and a pointer 316 to a page control table 32 controlling the oldest one of the updated pages. Any buffer corresponding to a page controlled by a page control table 32 is in an invalid or ineffective state. The buffer pool control table 31 further includes a pointer 317 to a page control table in a free state, a number of updated page 318 indicating the number of updated pages in the buffer pool 34, and a flag 319 denoting the deferred write state.

Figure 7:
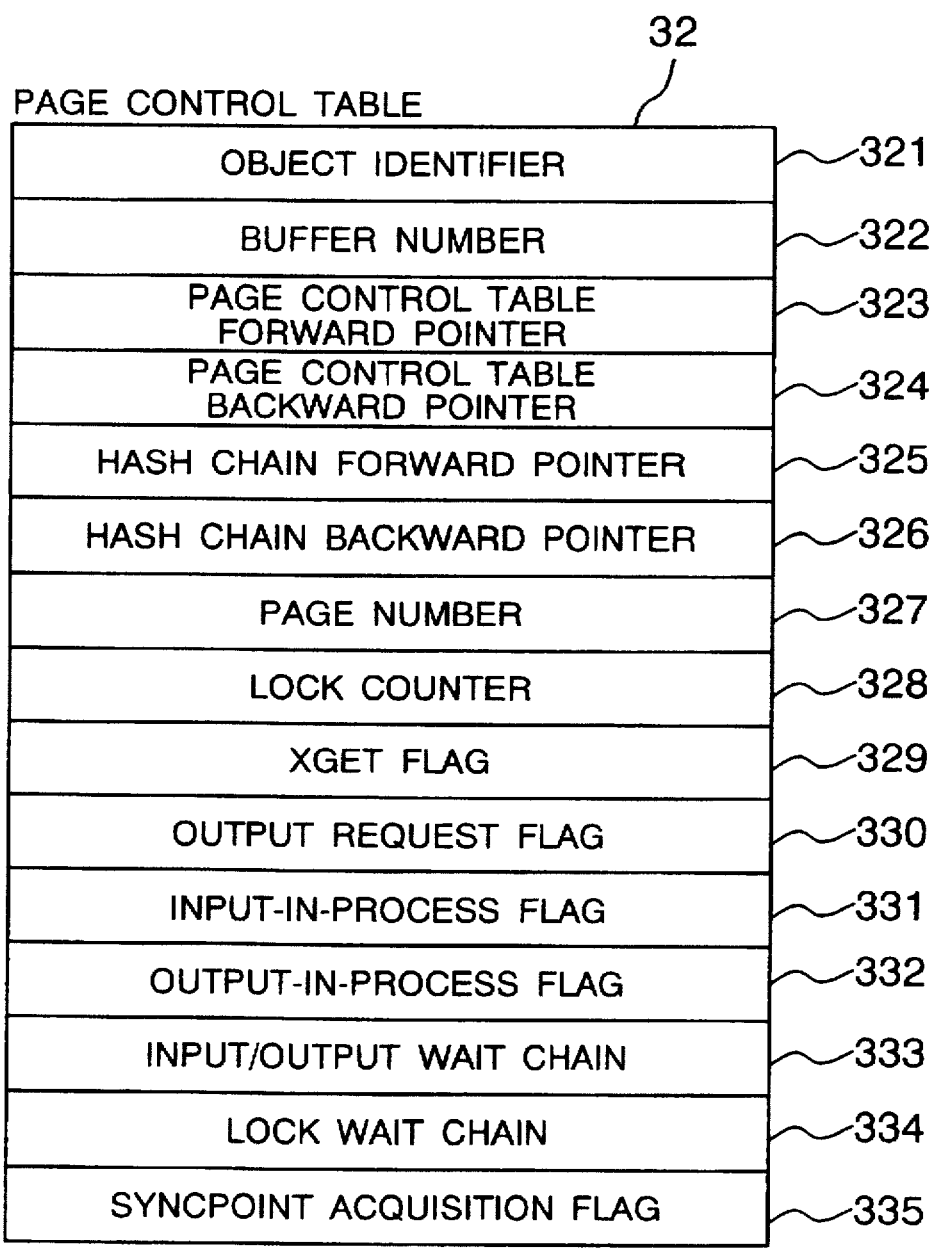
FIG. 7 is a diagram showing structural information of a page control table to control each page in the buffer pool of FIG. 2.

Next, information items of the page control table 32 will be described by referring to FIG. 7. The table 32 includes an identifier 321 designating the object identifier of a page stored, a buffer number 322, a forward pointer 323 and a backward pointer 324 when the table 32 is connected to the LRU or FREE chain, a forward pointer 325 and a backward pointer 326 when the table 32 is connected to the hash chain, a page number 327, a lock counter 328, an XGET flag 329 indicating a state of inputting a page in an exclusive mode, an output request flag 330, an input-in-process flag 331 denoting that data is being read from the database, an output-in-process state 332 designating that data is being written in the database, an input/output wait chain 333 indicating a state in which control is awaiting an input/output operation of the database, a lock wait chain 334, and a syncpoint acquisition flag 335 denoting that the page is set as an output object page during syncpoint acquisition according to an aspect of the present invention.

Referring now to FIG. 5, description will be given of relationships between the respective tables. The buffer pool control table 31 is coupled with the hash control table 33 by the hash control table pointer 312. When a hashing operation is carried out for page numbers of pages of the database, the hash control table 33 is connected via the pertinent hash entry thereof to the page control tables 32 respectively controlling the pages. For example, the hash entry 1 is connected to the page control tables 32a and 32b each having the same hash value. The LRU chain of the buffer pool control table 31 is linked with the page control tables 32 of which the output request flag 330 is in other than the output request state, namely, page control tables 32c and 32f in this example. The update LRU chain of the buffer pool control table 31 is coupled with the page control tables 32 of which the output request flag 330 is in the output request state, namely, page control tables 32d and 32h in this case. Furthermore, the FREE chain of the table 31 is related to the page control tables 31i and 32j. When handling a page not existing in the buffer pool, the buffer pool control part 23 allocates the page control table 32 in the FREE chain 317 and then inputs the page to a buffer associated with the page control table 32.

Figure 8:
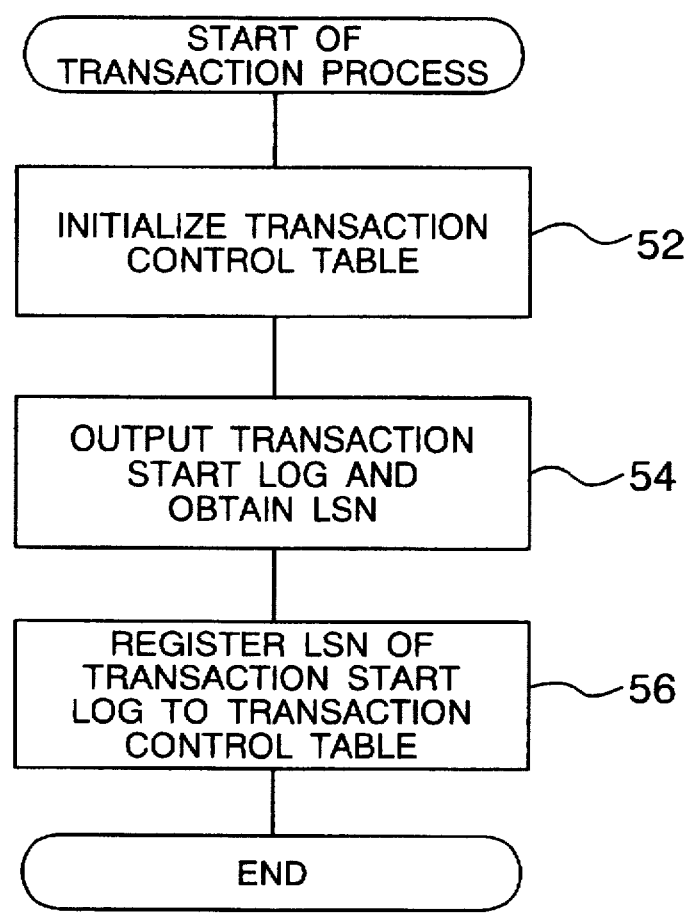
FIG. 8 is a flowchart showing the operation to initiate a transaction process.

Referring now to FIGS. 8 to 11, description will be given of a transaction process according to the present invention. When a transaction is received from the terminal 18 of FIG. 2, the transaction control part 24 commences a transaction initiating process. FIG. 8 shows a general processing flow of the transaction initiating process. When the transaction is started, a transaction control table is first assigned to the transaction and is then initialized (step 52). The transaction control table includes a transaction number, a log sequence number (LSN) of the transaction start log, an LSN of the current transaction, etc.

Figure 9:
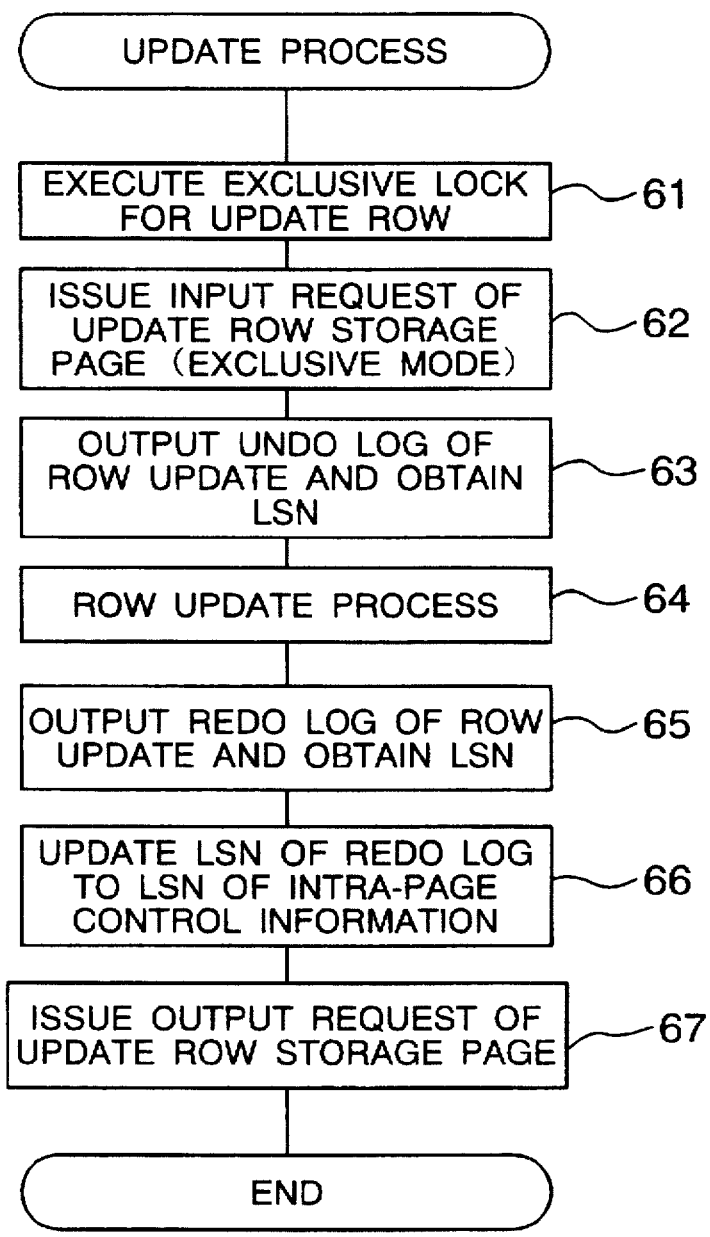
FIG. 9 is a flowchart showing the operation to update a database in a transaction process.

Subsequently, a transaction start log is generated and a log output request is issued to the logging part 27. The log is output to the log buffer 35 in the main storage 14. An LSN is then determined with integrity thereof kept in the database management system; thereafter, the LSN is attained for the log (step 54). The obtained LSN is registered to the transaction start log of the transaction control table to which the transaction belongs (step 56). When the transaction initiating process is completed as described above, a query process is executed for the database. FIG. 9 shows an outline of the processing flow of the database query process including database update operations. When the database management system conducts an exclusive control operation at the row level, a lock is obtained in the exclusive mode for the row specified as an object of the update operation (step 61).

When the lock is reserved for the row, a page input request is issued to the buffer pool control part 23 in the exclusive mode for a page in which the row is stored (step 62).

Thereafter, before the update is conducted for the row, an UNDO log is generated to later restore the updated row, and a write request of the log is issued to the logging part 27 and then an LSN is attained for the UNDO log (step 63). When the UNDO log is thus obtained, the row is updated (step 64). To restore the updated row through a re-execution, a REDO log is output to the logging part 27 and then an LSN is obtained for the log (step 65). The LSN thus attained for the REDO log is written in the LSN field 425 of the intra-page control information 42 and then the LSN of the REDO log is updated (step 66). To reflect the update of the pertinent page in the database, a page output request is issued to the buffer pool control part 23 (step 68).

However, the request is not immediately written in the database. Namely, an output request flag 330 is set to the output request state in the page control table 32 controlling the page. When the output request state is thus set, the updated page is maintained in the buffer pool 34 of the main storage 14 according to the replacing algorithm of the buffer pool until a buffer steal is conducted to forcibly write the page in the database for an input of another page or the page is asynchronously written in the database 16 by the deferred write processing part 25. Next, when the database access is completed for the transaction, operations are conducted in two phases for the transaction, thereby validating the transaction.

Figure 10:
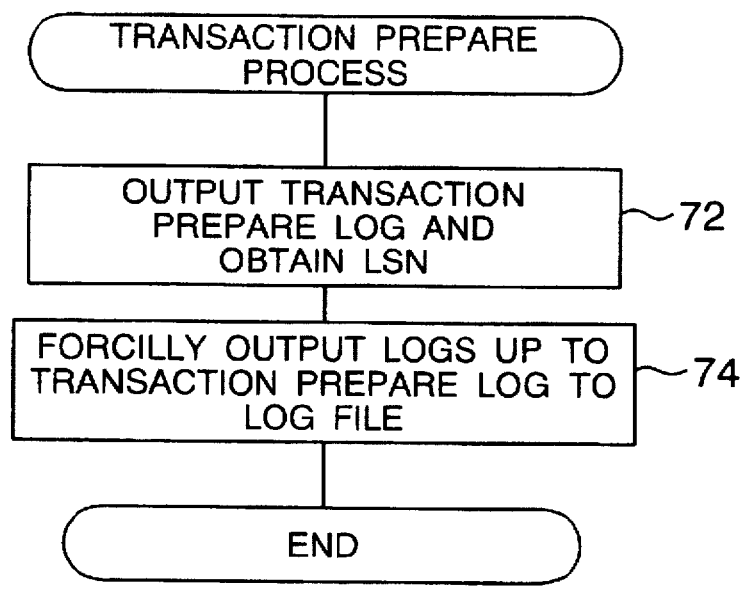
FIG. 10 is a flowchart showing the operation of PREPARE for a transaction.
Figure 11:
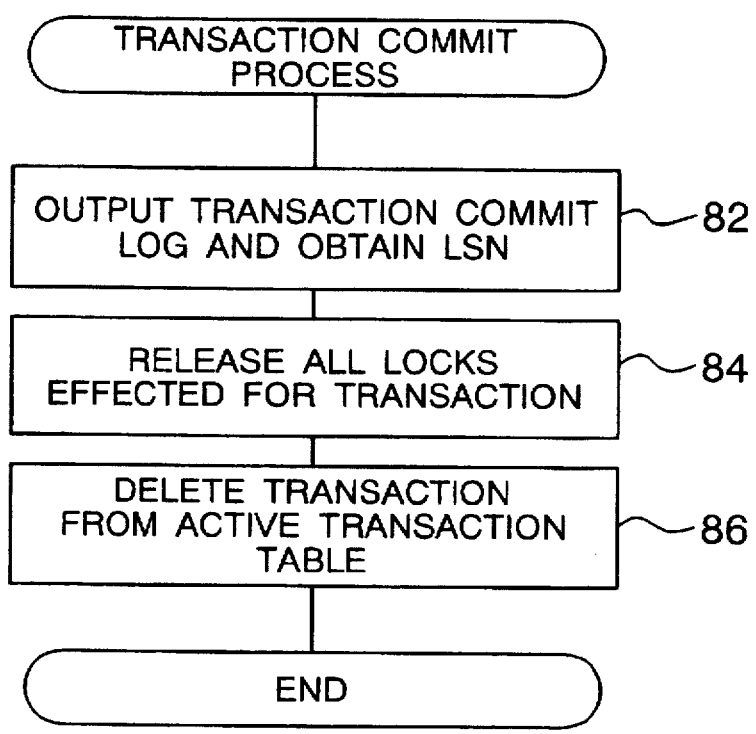
FIG. 11 is a flowchart showing the operation of COMMIT for a transaction.

First, description will be given of a PREPARE process phase of the transaction shown in FIG. 10. A PREPARE log of the transaction is first written in the log buffer (step 72). Subsequently, the logs up to the PREPARE log are forcibly output to the log file 37 (step 74). When the PREPARE phase is finished, a COMMIT phase is started to normally terminate the transaction. FIG. 11 shows a general processing flow of the COMMIT phase. A COMMIT log of the transaction is delivered to the log buffer (step 82). The COMMIT log is then forcibly output to the log file 37. Since the transaction is confirmed by the operation described above, the locks related to all exclusive resources attained for the transaction are released or unlocked (step 84). The transaction control table allocated when the execution of transaction is started is no longer necessary. Consequently, the transaction undergone the COMMIT phase is removed from the active hoving transaction table of the system and then the transaction control table is released (step 86).

Figure 1:
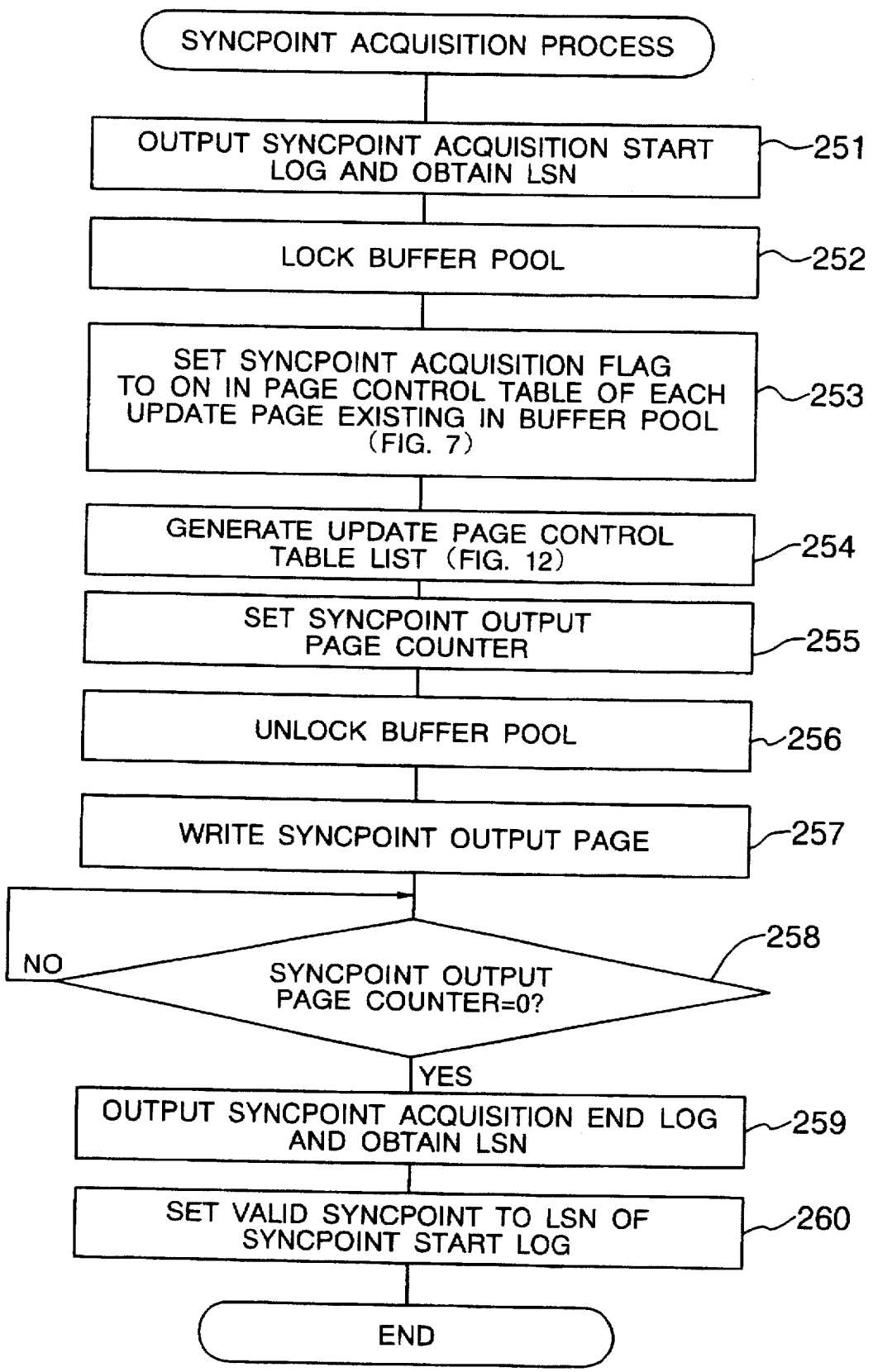
FIG. 1 is a general flowchart showing a syncpoint acquisition process according to an aspect of the present invention.

Next, referring to the general processing flow of FIG. 1, description will be given of the processing of syncpoint acquisition according to the present invention. Syncpoints are established to guarantee that the system, namely, the database can be restored and hence the system operation can be continued even when the system is stopped due to, e.g., a failure. Furthermore, the syncpoints also reduce the chance of using logs for which the REDO process is necessary when the database is restored. Timing of acquiring a syncpoint varies depending on the system implementation. However, the syncpoint is periodically established through an appropriate action at a fixed interval.

For example, there exists a method of obtaining a syncpoint when the number of operations to output logs to the log file becomes equal to a predetermined value. In this situation, the logging part 27 triggers the acquisition of the syncpoint. First, when a syncpoint acquisition request is passed to the syncpoint acquiring part 26, a syncpoint acquisition start log is generated to be written in the log buffer (step 251). Next, to temporarily guarantee physical integrity of the buffer pool at the start point of syncpoint acquisition, a lock is reserved (step 252). The lock, which is also called "latch" depending on cases, is different from that employed to guarantee logical integrity of the database and keeps information for a period of time that is less than that of the general lock. When the lock is reserved for the buffer pool, accesses to the buffer pool due to transactions are temporarily maintained in the wait state until the locked state is released.

Next, a scanning operation is conducted through the page control tables controlling all pages existing in the buffer pool 34. For each page of which the output request flag 330 is in the output request state, the syncpoint acquisition flag 335 is set to the syncpoint acquisition state (step 253). In concurrence with step 253, there is produced a page control table list 38 to control pages to be written in the database 16 during the syncpoint acquisition (step 254).

FIG. 12 shows the constitution of the output page control table list 38. The list 38 includes addresses 382a to 382d respectively of the page control tables 32 controlling the pages in the buffer pool 34 registered to the list 38 when the list 38 is created and a syncpoint output page counter 381 indicating the number of output pages. The last field of the list 38 is an information field 328e in which "0" is stored to denote that the next output page control table is missing. When the contents are completely stored in the list 38, the syncpoint output page counter 381 is determined (step 255). The counter 381 may be implemented by a semaphore.

Since the pages to be written in the database at the syncpoint are confirmed, the buffer pool is immediately unlocked (step 256). While the buffer pool is in the locked state, any input and output operations are inhibited for the external storages. This consequently leads to a short lock period of time in which only the CPU processing is executed. Thanks to this provision, the processing of transactions awaiting the unlocking of the buffer pool can be continuously executed. According to the output page control table list thus produced, for the pages to be written in the database at the syncpoint, a write request is issued to the deferred write processing part 25, thereby initiating the operation to write the pages in the database (step 257).

Whether or not all pages at the syncpoint have been completely output as the output objects to the database is determined according to whether or not the syncpoint output page counter 381 is set to zero (step 258). Consequently, the decision process is repeatedly executed in the wait state until the value of counter 381 becomes 0 for the following reasons. While one of the output pages is being written in the database, there may possibly be achieved a write operation due to another transaction. Consequently, when such a write operation is achieved for another transaction, the counter 381 is decremented in response thereto such that synchronization is required to be established in operation until the value becomes zero. When all pages specified as the output objects at the syncpoint are completely output to the database, namely, when the counter 381 is set to 0, the wait state is released. Thereafter, a syncpoint acquisition completion log is generated and stored in the log buffer and is forcibly written in the log file at the same time (step 259).

At completion of the syncpoint acquisition process, the LSN of the syncpoint start log is set as a valid syncpoint. Namely, the syncpoint is established as the current valid syncpoint (step 260). The LSN of current valid syncpoint is desirably stored in a non-volatile storage such as the external storage 16. That is, even when the system is stopped due to a failure or a trouble, the database can be restored through the system restart operation. In short, the LSN of the valid syncpoint is obtained to be set as the start point of restoration of the database. Subsequently, referring to FIGS. 1 and 3, description will be given of a general flow of the write operation of a syncpoint output page in step 257 of FIG. 1.

First, a current position (CP) is set to the first address of the output page control table list 38 specified for the output operation (step 2561). Next, a check is conducted to decide whether or not the address of the page control table indicated by the current position is 0. If this is the case, namely, all output pages have been completely written in the database or there is missing an output page, the output process is terminated (step 2562). Thereafter, the following process is repeatedly executed for all output pages. First, the lock counter 328 of the page control table 32 is checked. If the value of the lock counter 328 is more than 0, the page is removed from the output process such that the page is forcibly ouput to the database by a transaction in process. If the value of the lock counter 328 is 0, the buffer pool is locked (step 2564). The output flag 332 is set to the output-in-process state. Namely, any access to the database 16 is kept in the wait state until the page write operation is completed in the database 16 (step 2565).

Subsequently, since "counter 328=0" means that a buffer (page table) storing an objective page is connected to the update LRU chain, the buffer is disconnected therefrom and is then linked to the first position of the reference LRU chain. Moreover, the output request flag 330 is set to OFF (step 2567). When the process is terminated, the buffer pool is unlocked (step 2568). The page is then written in the database 16 (step 2569). When the page write operation is finished, the output-in-process flag 332 is set to OFF (step 2570). If an access is requested to the page by a transaction before the page output operation is terminated, since the transaction is beforehand registered to the input/output wait chain 333, a concurrency control process is carried out to activate all transactions registered to the chain 333 (steps 2571 and 2572). When the process is completed for the page, the current position is updated to indicate the address of the next page control table. As a result of the output process, the update operations corresponding to all logs prior to the syncpoint acquisition start log are reflected in the database.

For any page which is selected as an output object by the syncpoint acquisition process and which is thereafter removed from the output process, the buffer pool control part 23 guarantees that the page is written in the database by the transaction process. Namely, in the page control table 32 controlling the page selected as the output object, the point acquisition flag 335 having set before is still kept in this state. When the page for which the syncpoint acquisition flag 335 is set is used due to a transaction or when the usage thereof is terminated, the page is forcibly output to the database 16. Accordingly, it is guaranteed that the syncpoint process is accomplished without interrupting the transaction process. Referring next to FIGS. 14 to 19, description will be given of the operation of the buffer pool control part 23 when the syncpoint output page is written in the database 16.

Figure 14:
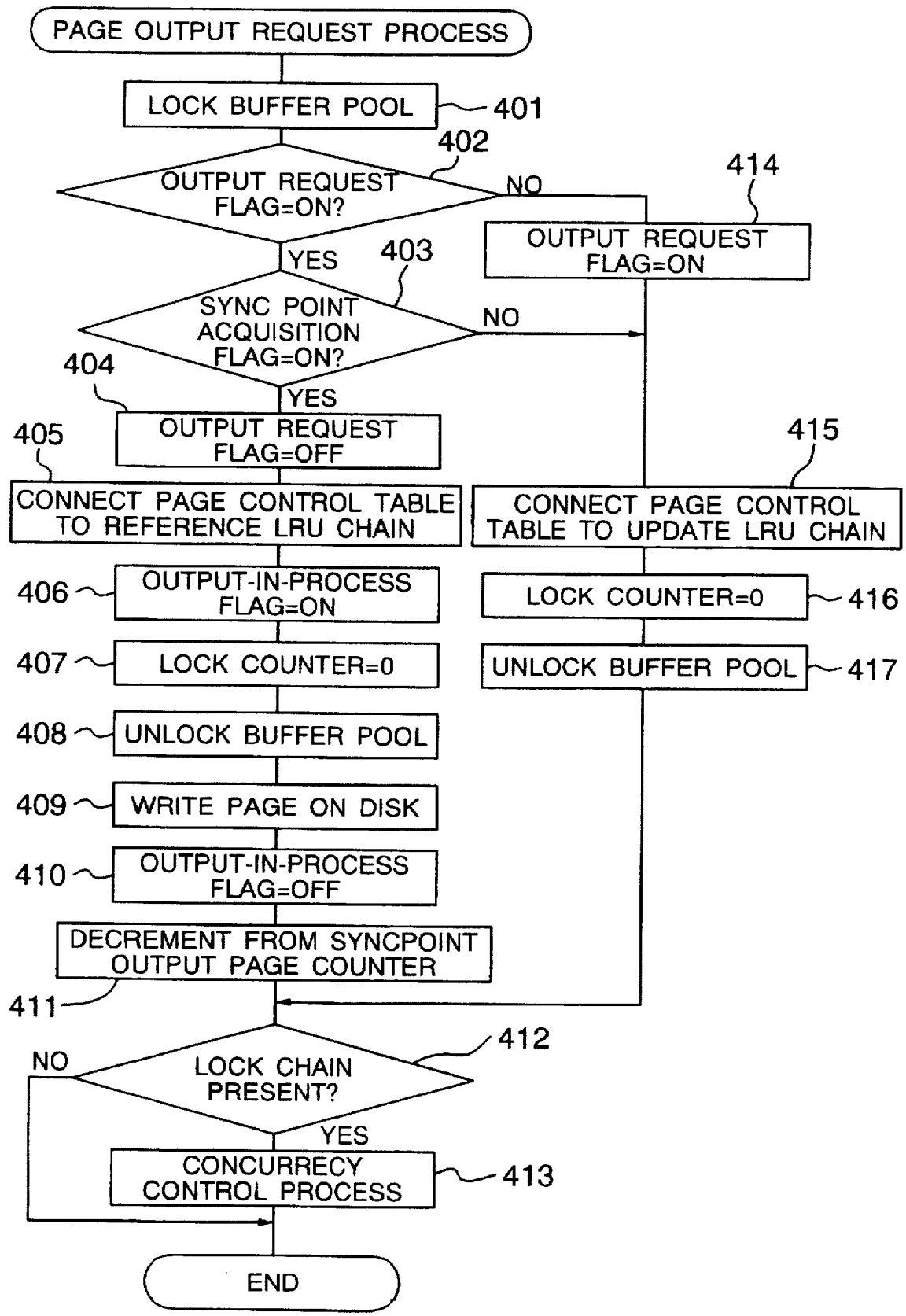
FIG. 14 is a flowchart showing the operation of an output request process in a buffer pool control part of FIG. 2.

FIG. 14 shows the processing flow of the buffer pool control part 23 to conduct an output request of a page containing an update row (step 67 of FIG. 9) in the database update operation during a transaction process. First, the buffer pool is locked (step 401). Next, a check is made to decide whether or not the output request flag 330 of the page control table 32 is ON (STEP 402). If the flag 330 is ON, a check is further conducted to determine whether or not the syncpoint acquisition flag 335 is ON (step 403). If the flag 335 is ON, it is assumed that a syncpoint is being acquired for the page and hence there possibly exists a chance in which the page is forcibly written in the database 16 due to the transaction.

First, the output request flag 330 is set to OFF (step 404) and a buffer storing an objective page is connected to the first position of the reference LRU chain (step 405). Thereafter, the output-in-process flag 332 is set to ON (step 406), the lock counter 328 is cleared to zero (step 407), and then the buffer pool is unlocked (step 408). After the buffer pool is unlocked, the page is immediately written in the database 16 (step 409). When the write operation is finished in the database 16, the output-in-process flag 332 is set to OFF (step 410). Since the page associated with the syncpoint acquisition has been written in the database 36, the value of the syncpoint output page counter 381 is decremented by one (step 411). If a reference is made to the page from another transaction before the output operation is terminated, the transaction has been registered to the lock wait chain 334. Consequently, to activate the first transaction registered thereto, a concurrency control process is carried out (steps 412 and 413). Moreover, if the output request flag 330 is OFF in step 402, the output request flag 330 is set to ON (step 414), the buffer is connected to the first position of the update LRU chain (step 415), the lock counter 328 is cleared to zero (step 416), and then the buffer pool is unlocked (step 417). In step 412, the concurrency control process is executed if there exists a lock wait chain.

Figure 15:
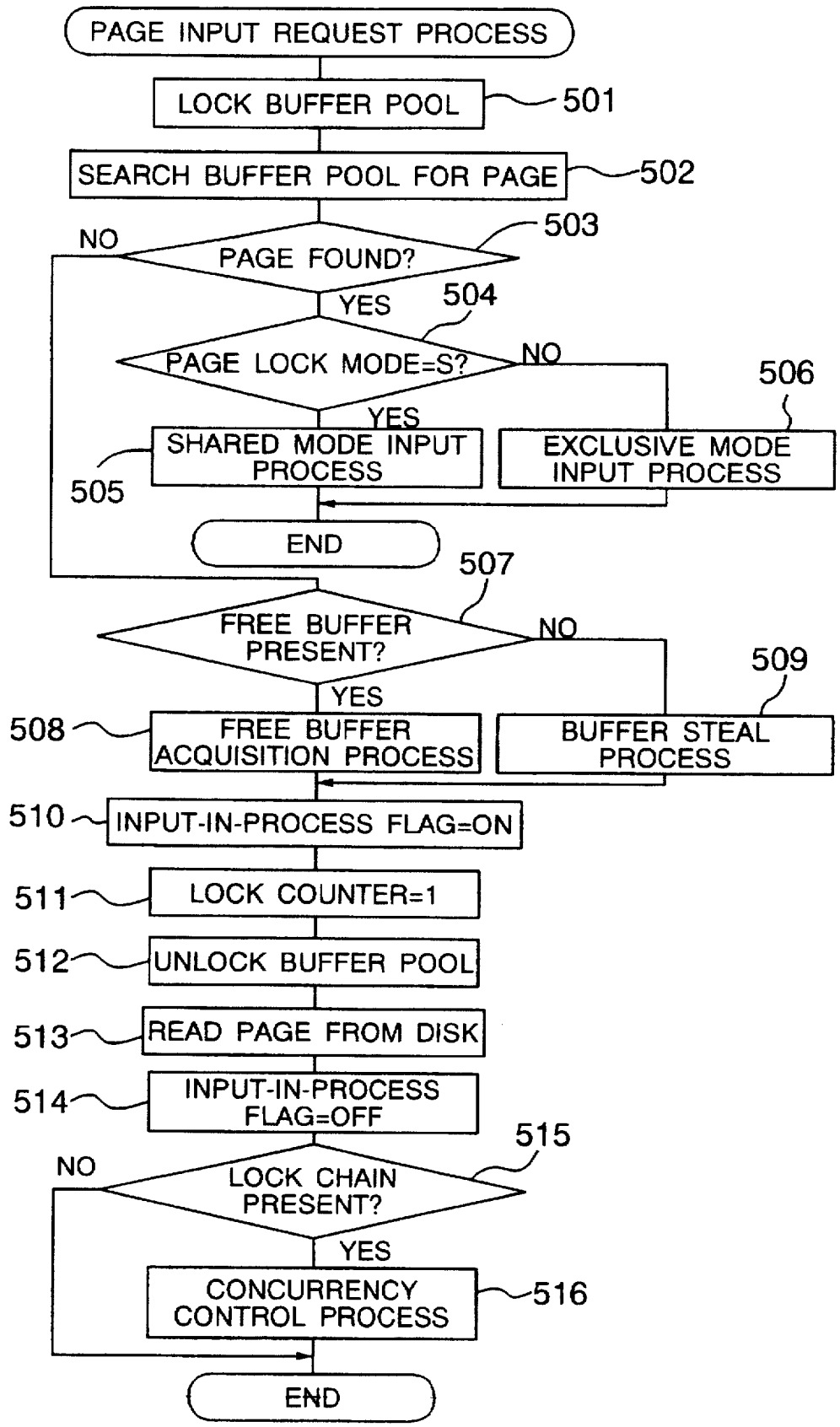
FIG. 15 is a flowchart showing the operation of an input request process in the buffer pool control part of FIG. 2.

FIG. 15 shows a processing flow of the buffer pool control part 23 to conduct a page input request operation when accessing the database in a transaction process. Fundamentally, when the requested page is present in the buffer pool 34, the page input process is completed without accessing the database 16. When the page is missing therein, the database 16 is accessed in the page input process. When the page exists in the buffer pool 34, when the page input request is issued in the exclusive mode and the syncpoint acquisition flag 335 is ON, the page is forcibly written in the database 16 and then the input request is processed.

First, the buffer pool 34 is locked (step 501) and a search is carried out through the buffer pool for an objective page according to the hash control table 33 (step 502). If the page exists in the buffer pool 34, an appropriate process is selected according to the page lock mode (steps 503 and 504). If the page lock is in the shared (S) mode, a shared mode input process is accomplished (step 505). If the page lock is in the exclusive (X) mode, there is executed an exclusive mode input process (step 506). When the objective page is missing, a check is made according to the FREE chain pointer 317 of the buffer control table 31 to determine whether or not there exists an available buffer (step 507). If there exists a buffer linked with the free chain pointer 317, there is allocated a page control table 32 connected to the free chain (step 508). When such a page control table 32 is missing for the free chain pointer 317, the reference and update LRU chains are checked to determine a page control table least used. The obtained table is set as the object of a steal process, namely, the table is assigned as a buffer to which the objective page is input (step 509).

The input-in-process flag 331 of the page control table 32 allocated as the buffer is set to ON indicating that an input operation is in process (step 510), the lock counter 328 is set to one (step 511), and then the buffer pool 34 is unlocked (step 512). In this situation, if the page lock is in the exclusive mode, the XGET flag 329 is also set to ON. Thereafter, the objective page is read from the database 16 (step 513). When the read operation is terminated, the input-in-process flag 331 is immediately set to OFF. If there exists a transaction registered to the input/output or lock wait chain, the concurrency control process is carried out (steps 514 to 516).

Figure 16:
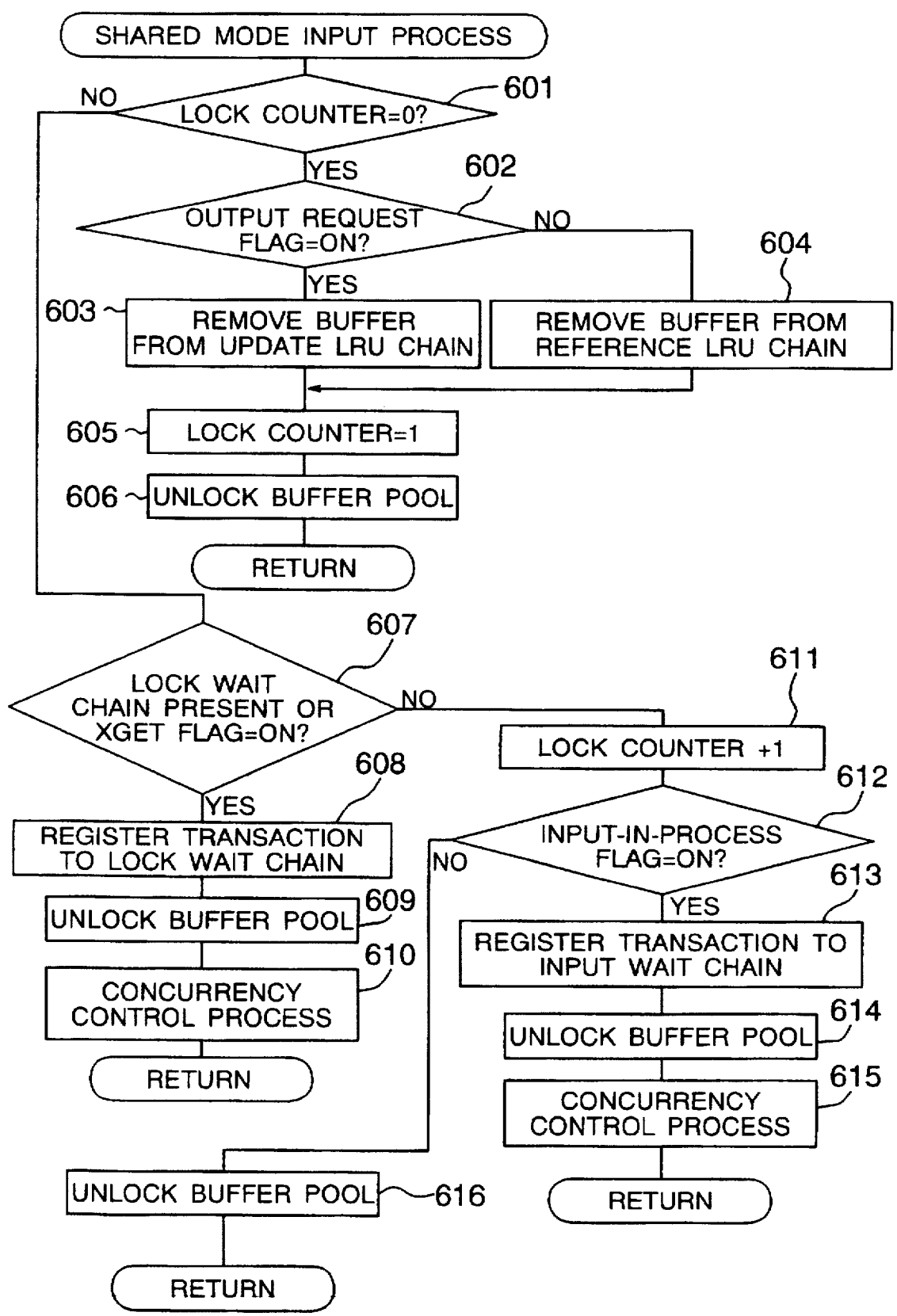
FIG. 16 is a detailed flowchart showing the operation of a page input process in a shared mode of FIG. 3.

Next, FIG. 16 shows the processing flow of the page input process when the page lock is in the shared mode. First, a check is made to determine whether or not the value of the lock counter 328 is 0 (step 601). If this is the case, a buffer storing an objective page is assumed to exist in the reference or update LRU chain. A check is conducted to determine whether or not the output request flag 330 is ON (step 602). If the flag 330 is ON, the buffer is assumed to be in the update LRU chain and hence is removed therefrom (step 603). If the output request flag 330 is OFF, the buffer is assumed to be in the reference LRU chain and hence is removed therefrom (step 604). Thereafter, the lock counter 328 is set to one (step 605) and the buffer pool is unlocked (step 607).

Moreover, if the lock counter 328 is other than 0 in step 601, namely, the page is being used by another transaction, a check is made to determine whether or not there exists a transaction registered to the lock wait chain 334 or whether or not the XGET flag is ON indicating that the pertinent page is locked in the exclusive mode for use thereof (step 607). If either condition is satisfied, the input request transaction is registered to the last position of the lock wait chain 334 (step 609). The buffer pool is unlocked (step 609) and the concurrency control process is accomplished to await the lock wait state being released (step 610). When neither condition is satisfied in step 607, i.e., the page is being used in the shared mode, the value of the lock counter 328 is incremented by one (step 611). A check is made to determine whether or not the input/output-in-process flag is ON (step 612). If data is being input from the database 16, the pertinent transaction is registered to the input/output wait chain 333 (step 613), the buffer pool is unlocked (step 614), and then the concurrency control process is effected to await the transaction being set to the active state (step 615). If the input/output-in-process flag is OFF in step 612, namely, the data is not being input from the database 16, the buffer pool 34 is immediately unlocked to terminate the process (step 616).

Figure 17:
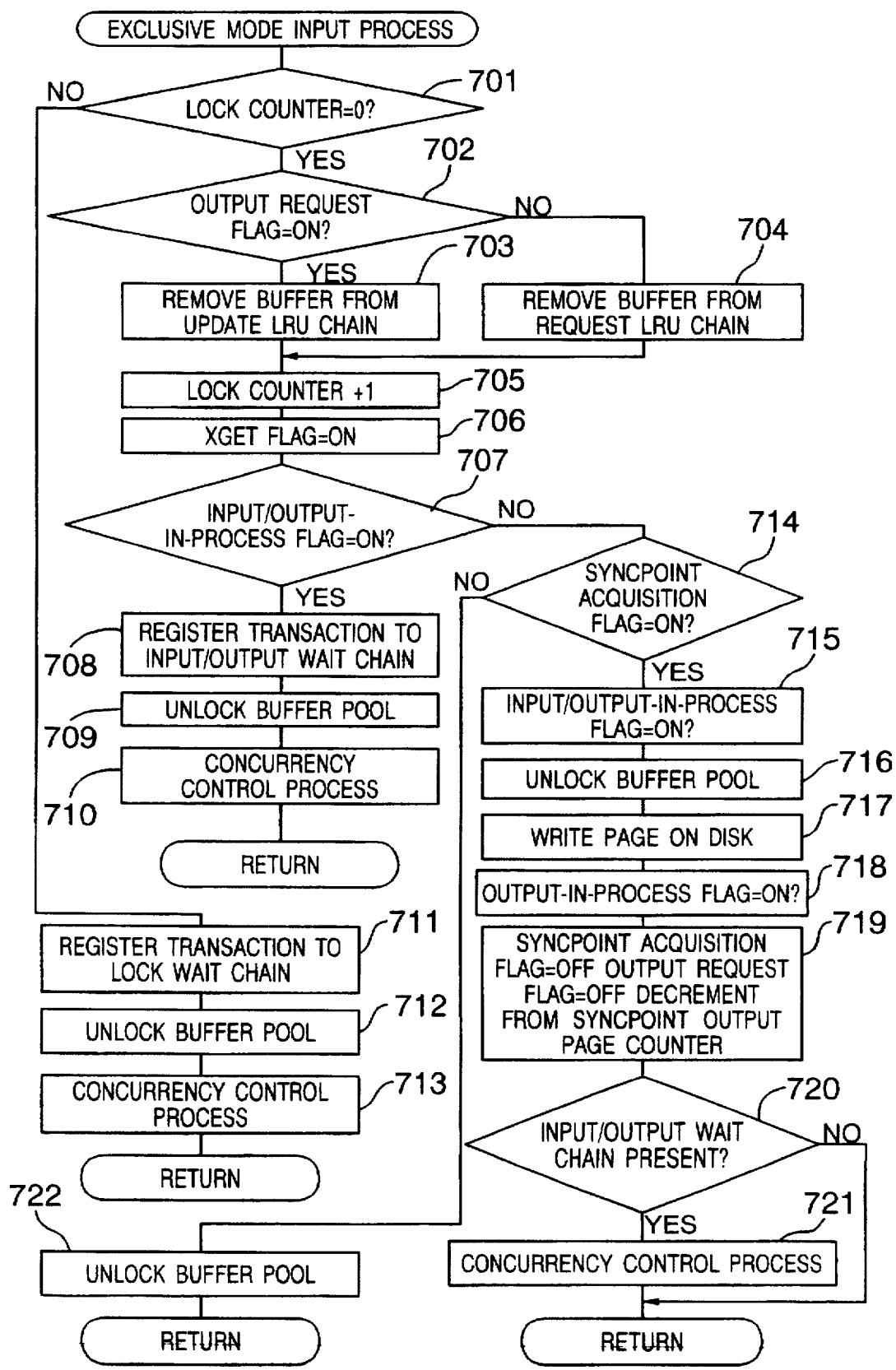
FIG. 17 is a detailed flowchart showing the operation of a page input process in an exclusive mode of FIG. 3.

Next, FIG. 17 shows the processing flow of the input process when the page is locked in the exclusive mode. First, whether or not the lock counter 328 is 0 is determined (step 701). If the counter 328 is 0, it is assumed that the buffer storing an objective page exists in the reference or update LRU chain. A check is then conducted to determine whether or not the output request flag 330 is ON (step 702). If this is the case, the buffer storing the objective page is assumed to be in the update LRU chain and is hence released therefrom (step 703). If the flag 330 is OFF, the buffer exists in the reference LRU chain and is therefore released therefrom (step 704). Thereafter, the lock counter 328 is set to one (step 705).

Since the lock is effected in the exclusive mode, the XGET flag 329 is set to ON and then a check is made to determine whether or not the input-in-process flag 331 is ON (step 707). If data is being input from the database 16, the transaction is registered to the input/output wait chain 333 (step 708), the buffer pool 34 is unlocked (step 709), and then the concurrency control process is carried out to await an event that the transaction is set to the active state (step 710). If the input/output operation is not in process in step 707, a check is conducted to determine whether or not the syncpoint acquisition flag 335 is ON (step 714). If the flag 335 is ON, the output-in-process flag 332 is set to ON (step 715) and then the buffer pool 34 is unlocked (step 716).

Thereafter, the page is forcibly written in the database 16 (step 717). When the write operation is completed, the output-in-process flag 332 is set to OFF (step 718) and the syncpoint acquisition flag 335 and output request flag 330 are set to OFF. Furthermore, since the output page designated at the syncpoint acquisition has been written in the database 36, the value of syncpoint output page counter 381 is decremented by one (step 719). If there exists a transaction registered to the input/output wait chain, there is executed the concurrency control process (steps 720 and 721). If the syncpoint acquisition flag 335 is OFF in step 714, the buffer pool 34 is immediately unlocked (step 722).

Figure 18:
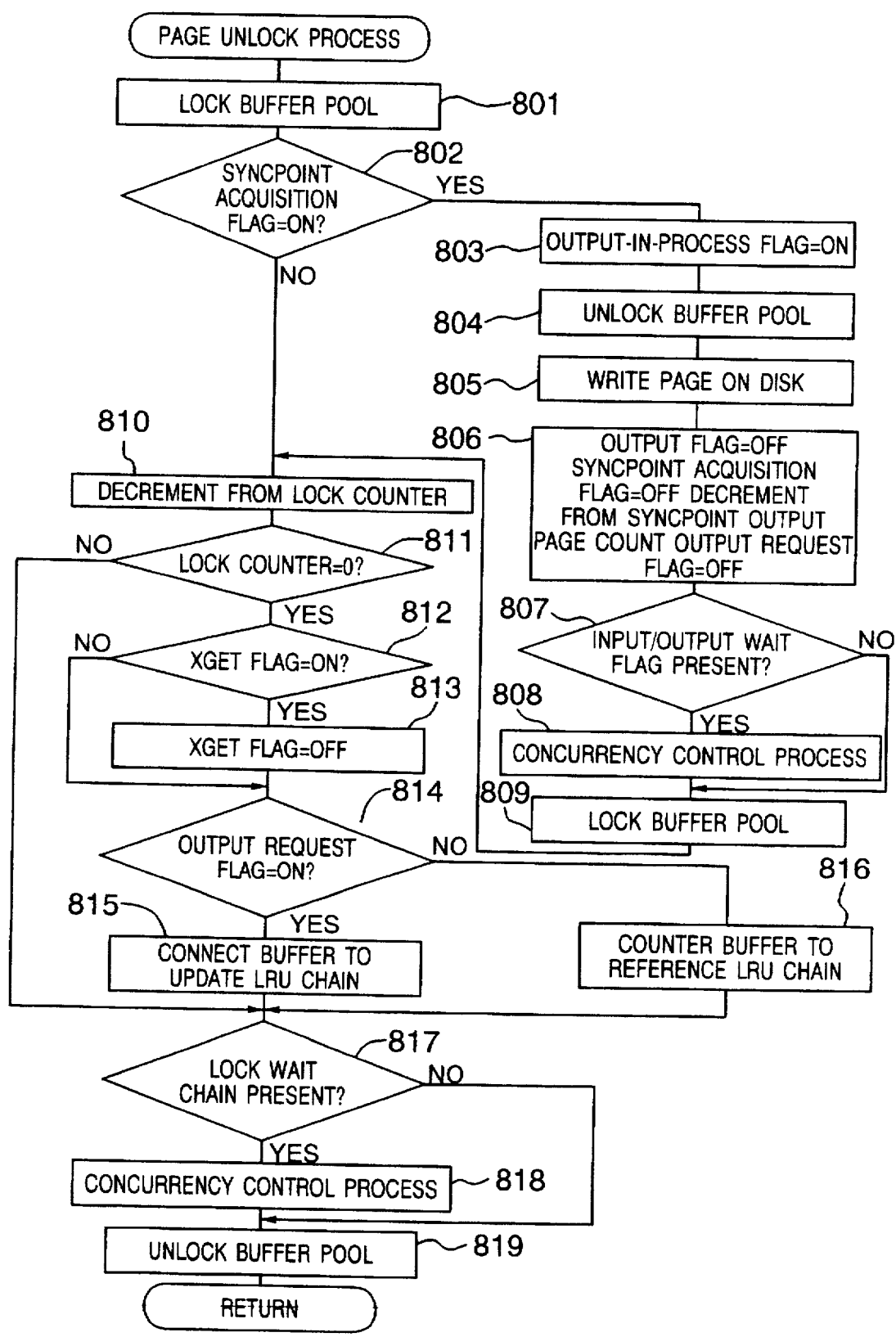
FIG. 18 is a flowchart showing the operation of a page unlocking process of the buffer pool control part of FIG. 2.

FIG. 18 shows the processing flow of the page unlock process when usage of a page accessed due to a transaction is finished. First, the buffer pool 34 is locked (step 801). Next, a check is made to determine whether or not the syncpoint acquisition flag 335 is ON (step 802). If the flag 335 is ON, the output-in-process flag 332 is set to ON (step 803) and the buffer pool is unlocked (step 804). The pertinent page is then written in the database 16 (step 805). When the page write operation is terminated in the database 16, the output-in-process flag 332, syncpoint acquisition flag 335, and output request flag 330 are set to OFF in the page control table 32. Additionally, since the output objective page designated at the syncpoint acquisition has been written in the database 36, the value of the syncpoint output page counter 381 is decremented by one (step 806).

Subsequently, if an access is made to the pertinent page during the write operation in the database 36, the concurrency control process is accomplished to activate the transaction registered to the input/output wait chain 333 (steps 807 and 808) and the buffer pool is again locked (step 809). If the syncpoint acquisition flag 335 is OFF in step 802 or if the flag 335 is ON and the write operation is terminated in the database 16, the value of the lock counter 328 is decremented by one (step 810). When the lock counter 328 is 0 and the XGET flag 329 is ON, the XGET flag 329 is set to OFF (steps 811 to 813).

When the output request flag 330 is ON, a buffer storing an objective page is connected to the update LRU chain. If the flag 330 is OFF, the buffer is linked with the reference LRU chain (steps 814 to 816). If the lock counter 328 is other than 0 in step 811, i.e., if there exists another transaction still using the page or there exists another transaction registered to the lock wait chain 334 during the operation to connect the pertinent transaction to the LRU chain, there is conducted the concurrency control process to release the transaction from the lock wait state, and then the buffer pool is unlocked (steps 817 to 819).

Figure 19:
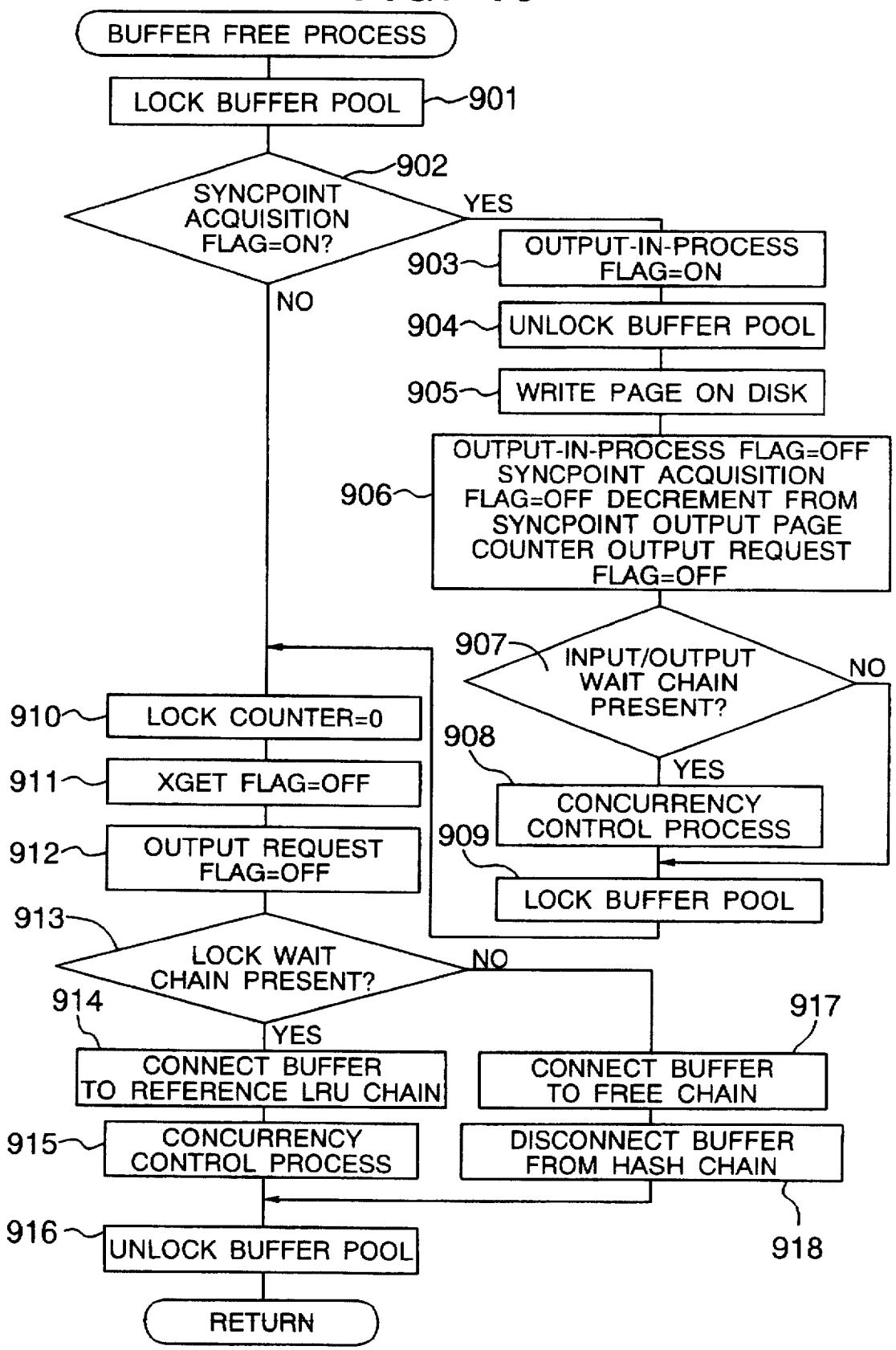
FIG. 19 is a flowchart showing the operation of a buffer FREE process of the buffer pool control part of FIG. 2.

FIG. 19 shows the processing flow of registration of a page control table in which when an accessed page becomes unnecessary in a transaction process, the page control table controlling the pertinent page is registered to the FREE chain. First, the buffer pool is locked (step 901). Next, a check is accomplished to determine whether or not the syncpoint acquisition flag 335 is ON (step 902). If the flag 335 is ON, the output-in-process flag 332 is set to ON (step 903) and then the buffer pool is unlocked (step 904). Thereafter, the page is written in the database 16 (step 905). When the page write operation is terminated, the output-in-process flag 332, syncpoint acquisition flag 335, and output request flag 330 are set to OFF in the page control table 32. Since the output page at syncpoint acquisition has been written in the database 36, the syncpoint output page counter 381 is decremented by one (step 906).

Subsequently, when the page is accessed during the page write operation in the database 16, there is conducted the concurrency process to activate the transaction registered to the input/output chain 333 (steps 907 and 908) and then the buffer pool is again locked (step 909). If the syncpoint acquisition flag 335 is OFF in step 802 or if the page write operation is terminated in the database 16 when the syncpoint acquisition flag 335 is OFF, the lock counter 328 is cleared to zero (step 910).

Additionally, the XGET flag 329 and output request flag 330 are set to OFF (steps 911 and 912). When there exists a transaction registered to the lock wait chain 334 before the buffer is connected to the FREE chain, the buffer is to be connected to the reference LRU chain. Consequently, there is executed the concurrency control process to release the locked state of the buffer (steps 913 to 915). If a transaction registered to the lock wait chain 334 is missing in step 913, the pertinent page control table 32 is connected to the FREE chain of the buffer pool control table 31 and then is disconnected from the hash chain (steps 917 and 918). When the operations above are terminated, the buffer pool is unlocked (step 916).

Figure 20:
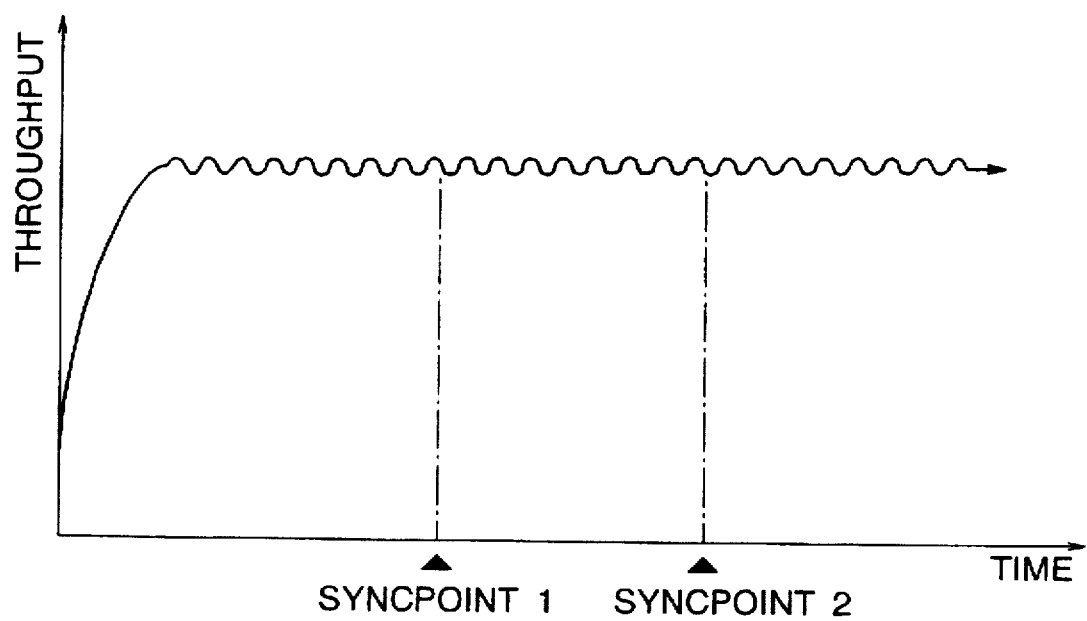
FIG. 20 is a graph showing a performance characteristic of the data management system according to the present invention.

Detailed description has been given of an embodiment according to the present invention. When the database management system configured according to the present invention initiates a transaction process, the system throughput, namely, the transaction processing amount per unitary time is obtained as shown in FIG. 20. The throughput is developed when transactions are uniformly supplied to the system. Even when the syncpoint is established at a fixed interval of time, the throughput is not lowered in the system.

Next, description will be given of an embodiment in which the advantageous effect of the present invention is further enhanced. In the description of the embodiment above, the updated pages existing in the buffer pool at the start of syncpoint acquisition are stored in the database through the syncpoint acquisition while guaranteeing integrity of the database. However, in the syncpoint interval, since the deferred write process part 25 of FIG. 2 ordinarily conducts a data write operation in the database in an asynchronous manner according to the number of updated pages in the buffer table, the control operation is carried out to minimize the number of updated pages in the buffer pool at the syncpoint acquisition point.

Figure 23A:
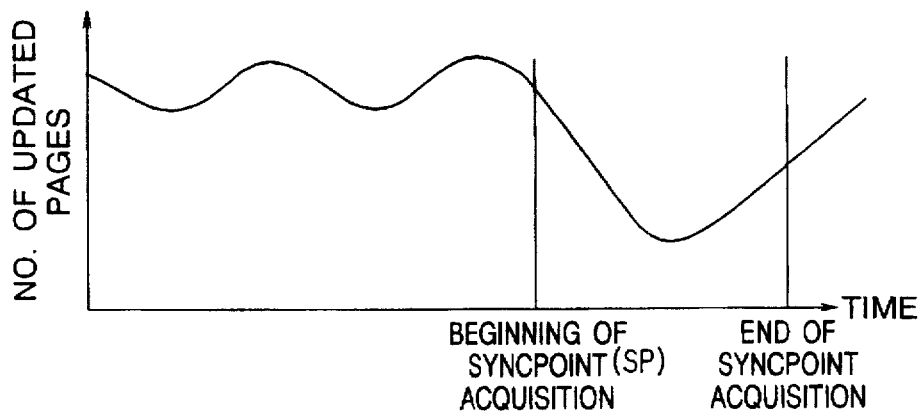
FIGS. 23A to 23C are graphs showing a change with respect to time in the ratio of updated pages in the buffer table when the pre-syncpoint process is effected to obtain the advantage of the present invention.

However, as can be seen from FIG. 23A, when the output pages occupy a large part of the entire buffer pool at the syncpoint acquisition point, a long period of processing time is required to obtain a syncpoint due to the large number of pages to be written in the database. To overcome the difficulty, there may be considered a method in which frequency of the deferred write operation ordinarily conducted at the syncpoint interval is increased. Namely, the ratio of updated pages in the overall buffer pool is set to a small value such that the deferred write operation is initiated when the ratio of updated page actually becomes equal to the preset value. In the following paragraphs, description will be given of an embodiment, namely, another method using a pre-syncpoint. The pre-syncpoint is employed to write a large number of updated pages of the buffer pool in the database in advance by the deferred write process before the start point of syncpoint acquisition.

Figure 21:
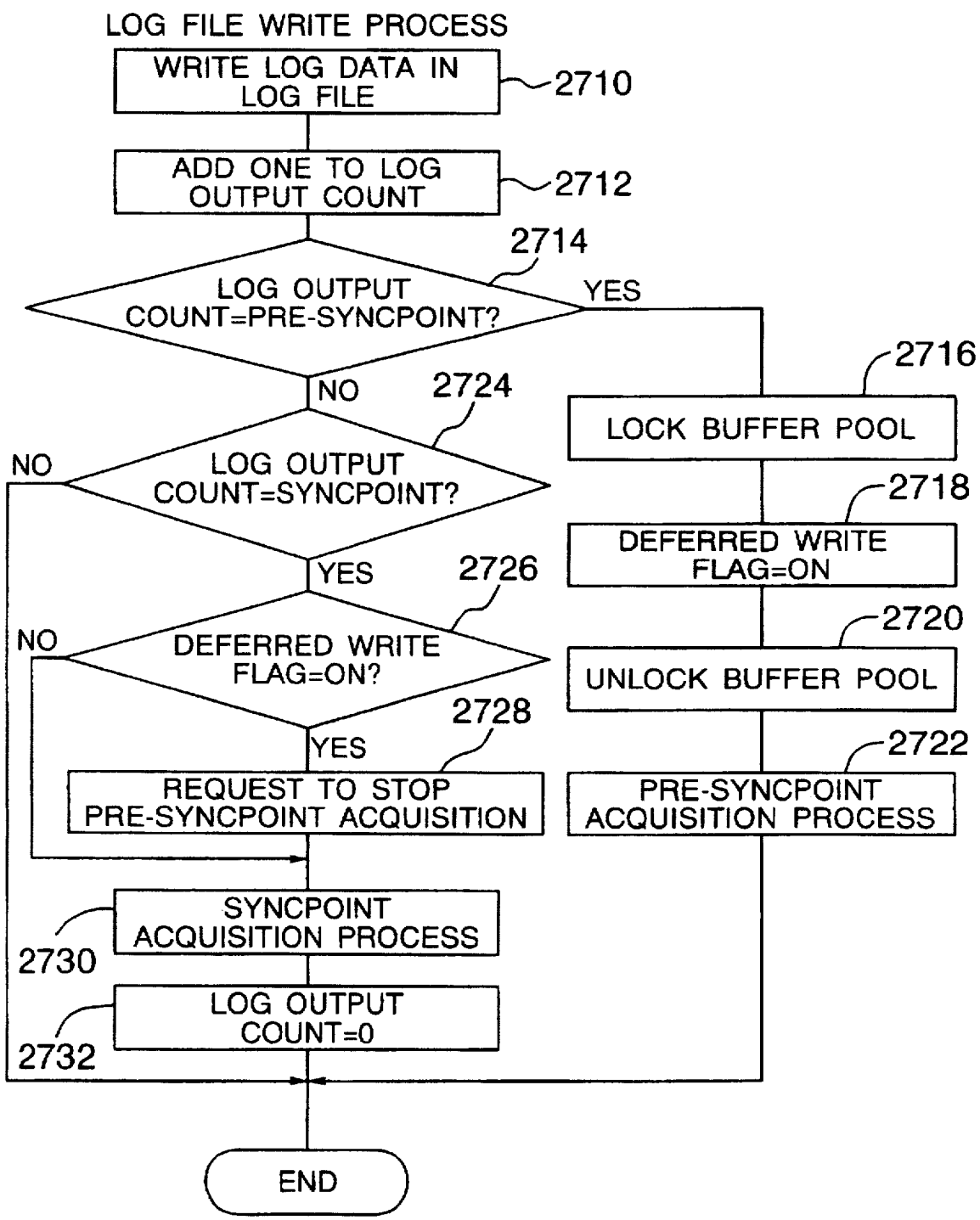
FIG. 21 is a flowchart showing a log write process to control acquisition of pre-sync and syncpoints.

FIG. 21 shows the general processing flow of controlling the acquisition of the pre-sync and syncpoints when the log writing part 27 of FIG. 2 conducts the logging operation in the log file 37 at an interval of syncpoints. Log data written in the log buffer 35 by COMMIT or ROLLBACK executed for transactions is forcibly output to the log file 37 as follows. First, the data is written in the log file 37 (step 2710). When the write operation is terminated, the log output count indicating the number of log output operations is incremented by one to control the syncpoint interval (step 2712).

The log output count is compared with the value associated with the pre-syncpoint acquiring point to determine whether or not control reaches the pre-sync acquiring point (step 2712). If the point is reached, the buffer pool is locked (step 2716) and then the deferred write flag 319 is set to ON in the buffer control table 31 (step 2718). After the flag 319 is set to ON, the buffer pool is unlocked (step 2720) and control is passed to the pre-syncpoint acquiring process (step 2722). If the pre-syncpoint acquiring point is reached or is already passed in step 2714, a comparison is effected to determine whether or not a syncpoint acquiring point is reached (step 2724). If the pre-syncpoint is reached, a check is further carried out to determine whether or not the deferred write flag 319 is ON (step 2726). If the flag 319 is ON, it is assumed that the pre-syncpoint acquiring process has not been finished yet and hence a request to immediately stop the pre-syncpoint acquiring process is sent to a process executing the pre-syncpoint acquiring process (step 2728). This method is accomplished by "signal", "semaphore", etc.

Figure 22:
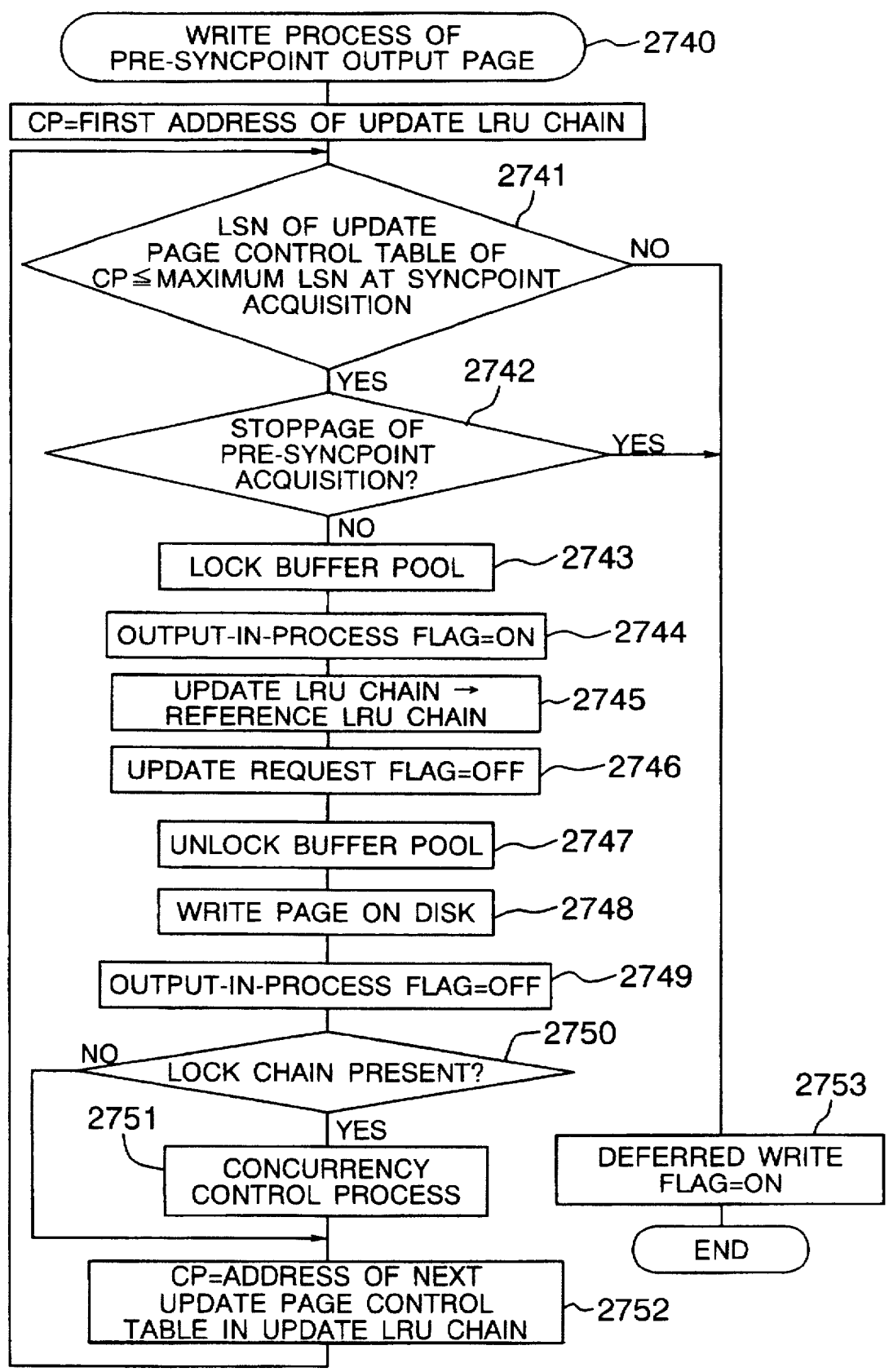
FIG. 22 is a flowchart showing the operation of the pre-syncpoint acquisition.

When the pre-syncpoint acquiring process is stopped or is already finished, control is transferred to the syncpoint acquiring process (step 2730). When the syncpoint acquiring process is terminated, the log output count is cleared to zero (step 2732). Next, description will be given of the processing flow of the pre-syncpoint acquiring process by referring to FIG. 22. This process is basically achieved as follows. Pages registered to the update LRU chain of the buffer control table 31 are written in the database 36. Referring to the log sequence number (LSN) 425 of each page in the update LRU chain at pre-syncpoint acquisition, the latest LSN is selected to be memorized as the maximum LSN at pre-syncpoint acquisition.

First, an address of the page control table controlling the first address of the update LRU chain, i.e., the oldest updated page is set to the current position (CP; step 2740). The LSN 425 of the page controlled by the page control table 32 indicated by the CP is compared with the maximum LSU at pre-syncpoint acquisition (step 2741). When the LSN 425 of the page controlled by the page control table 32 indicated by the CP is less than the maximum LSU, the page is assumed to be output to the database 36 in the pre-syncpoint acquisition process.

When the syncpoint acquiring point is reached during the pre-syncpoint acquisition process, since there may possibly exist a case where a pre-syncpoint acquisition terminating request is issued in advance, a check is accomplished to determine whether or not the request is issue beforehand (step 2742). If the request is not issued in advance, the pre-syncpoint acquiring process is continued. First, the buffer pool is locked (step 2743). The output-in-process flag 332 is then set to the output state such that the other transactions accessing thereto are set to the wait state until the write operation is completed in the database 16 (step 2744).

Subsequently, the buffer is disconnected from the update LRU chain to be registered to the reference LRU chain (step 2745). Thereafter, the output request flag 330 is set to OFF (step 2746). When the operation is finished, the buffer pool is unlocked (step 2747) and then the data is written in the database (step 2748). When the write operation is terminated in the database 16, the output-in-process flag 332 is set to OFF (step 2749). If a reference operation is requested from a transaction before the write operation is terminated in the database 16, the transaction is connected to the input/output request chain 333. Consequently, the concurrency control process is carried out to activate all transactions registered to the chain 333 as above (steps 2751 and 2752). If the pre-syncpoint acquiring process is completed in step 2741 or if a pre-syncpoint acquisition terminating request has been received in step 2742, the deferred write flag 3190 is set OFF in the final processing step of the pre-syncpoint acquiring process.

Figure 23B:
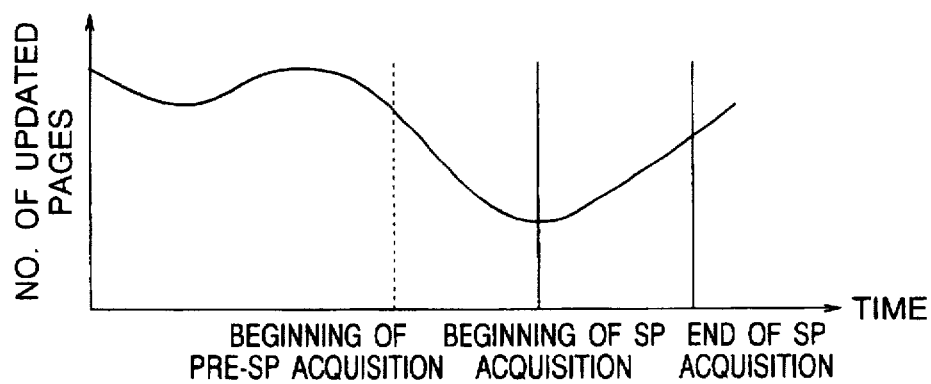
Figure 23C:
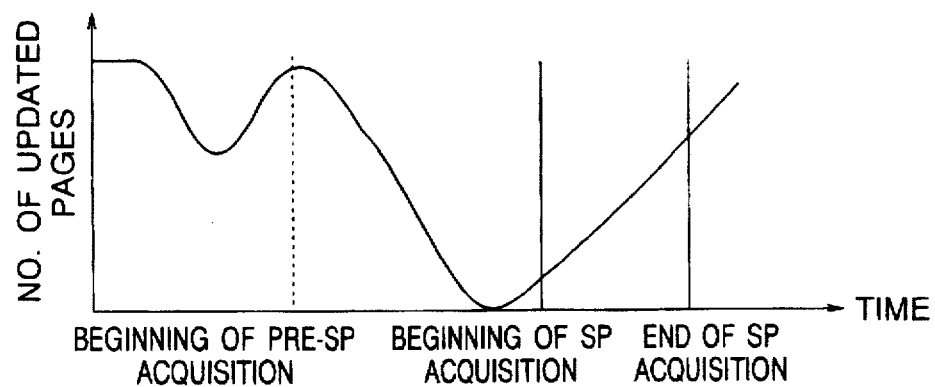

FIGS. 23A to 23C show the advantageous effect of the pre-syncpoint. When the log output count is employed as a reference value to set the syncpoint interval, the pre-syncpoint is assumed to be set when the log output count becomes equal to be a predetermined value. The syncpoint interval may also be set according to other than the log output count. For example, when the syncpoint interval is set at a predetermined point of time, a point of time preceding the predetermined point of time by a fixed period of time may be designated as the pre-syncpoint acquiring point.

In the description of the embodiment, the syncpoint interval is determined according to the log output count. In this situation, initiation of pre-syncpoint acquisition is triggered by the log writing part 27 of FIG. 2. In this part 27, depending on a log write request from a transaction, log data is accumulated in the log buffer (cache) 35 such that when the log buffer 35 becomes full of data, the data of the log buffer 35 is forcibly written in the log file 37. Alternatively, the forcible write operation is also accomplished in the log file 37 in response to Commit or Rollback executed for a transaction. In this occasion, the number of output operations to the log file 37 is stored in the main storage. Thereafter, when the output count reaches a predetermined value associated with the syncpoint interval, control is passed to the deferred write processing part 25.

For example, when the syncpoint interval is set to 1000, when the number of output operations to the log file 37 reaches 1000, there is established a syncpoint acquiring point. Moreover, when the output count reaches 80% thereof, i.e., 800, a pre-syncpoint is assumed. In the deferred write process in ordinary cases, when the number of updated pages reaches a predetermined value in the buffer pool, although the data of the updated pages are started to be written in the database, the write operation is not conducted for all updated pages. Namely, a preset number of pages are written in the database in most cases. However, at pre-syncpoint acquiring point, all updated pages existing in the buffer pool at the pertinent point of time are written in the database. Thanks to this operation, as can be seen from FIGS. 23B and 23C, most updated pages in the buffer pool are written in the database before the syncpoint acquisition is initiated.

Ideally, it is desirable that the number of updated pages in the buffer becomes zero at syncpoint acquiring point. However, as shown in FIG. 23B, even when there is accomplished a process to write updated pages in the database at the pre-syncpoint, there may still remain, at the syncpoint acquiring point, updated pages to be written in the database. On such an occasion, the remaining updated pages are written in the database in the syncpoint acquiring process. In addition, conversely, the syncpoint acquiring point is not reached even when all updated pages in the buffer pool are written in the database at the pre-syncpoint as shown in FIG. 23C. In this case, the updated pages existing in the buffer pool at the syncpoint acquiring point are set as the pages to be output to the database at the syncpoint acquiring point.

To avoid the cases as shown in FIGS. 23B and 23C in which updated pages are remaining when the syncpoint acquisition is started, the point to start acquisition of the pre-syncpoint is determined as follows. When starting syncpoint acquisition, whether or not a pre-syncpoint is already acquired is memorized. If the pre-syncpoint has not been established, the point of starting pre-syncpoint acquisition is corrected to an earlier point of time according to the number of updated pages not written in the database. If the pre-syncpoint has already been established, the point of initiating pre-syncpoint acquisition is corrected to a delayed point according to the number of updated pages existing at syncpoint acquisition. The obtained point of time is set as the start point of pre-syncpoint acquisition for the next syncpoint.

In the database management system according to the present invention as described above, all updated pages existing in the buffer pool at initiation of syncpoint acquisition are marked such that the marked pages are designated as the pages to be output to the database. Consequently, even during a syncpoint acquiring process, input/output operations can be conducted without interrupting the transaction process. Namely, the transaction processing amount is kept to be more than zero during the syncpoint acquiring process.

In addition, thanks to the pre-syncpoint process, the number of updated pages existing in the buffer pool can be reduced at the point of syncpoint acquisition, which consequently leads to a remarkable decrease in the period of time necessary to acquire the syncpoint.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. In a database management system for performing a plurality of transactions concurrently, in which a restart recovery process is assumed at an occurrence of a system failure, a method for acquiring a synchronization point (syncpoint) for assuring a database version on an external storage, said syncpoint being determined at each interval at which database update logs from the transactions are accumulated (incremented) to a given amount, said method comprising the steps of:

assigning, at the beginning of acquisition of a syncpoint, a mark indicating that syncpoint acquisition is in progress, the tables controlling all updated pages in a buffer pool mapped onto a main storage, said buffer pool including a plurality of buffers for storing respective pages, said updated pages not having been written into a database of an external storage;

writing, during the syncpoint acquisition, the updated pages for the marked table to the database of the external storage;

executing a transaction for further updating specific ones of the updated pages for the marked tables during the syncpoint acquisition process, before the updated page or pages are accessed, writing the further updated specific page or pages to said database, removing the mark from the control table for the further updated specific pages to allow a request of access to the further updated specific pages; and determining, in response to termination of the write operation to said database, that the syncpoint acquisition is completed at the end of the write operation for all updated pages for the marked tables.

2. A database management method according to claim 1, further comprising the steps of:

detecting a point of time relative to a previous syncpoint acquiring point when an amount of log data written in a log file reaches a predetermined value;

setting said detected point of time as a pre-syncpoint acquisition point; and asynchronously writing the updated pages in said buffer pool to said external storage of said database during a period of time ranging from the pre-syncpoint acquisition point to the beginning of syncpoint acquisition.

3. A database management method according to claim 2, wherein said pre-syncpoint acquisition process includes the step of assigning, at the beginning of syncpoint acquisition for each of the updated pages in the buffer which are not written in the database before the beginning of syncpoint acquisition, a mark indicating that syncpoint acquisition is in process to the updated page control table controlling all updated pages in the buffer.

4. A database management method according to claim 1, wherein the step of allowing an access request to the further updated specific pages after removal of the mark includes the steps of:

checking ON/OFF of a syncpoint acquisition flag disposed in the page control table controlling each page in the buffer, the flag indicating that a page is assigned as an output page at syncpoint acquisition;

setting, at detection of an event that the flag is ON, an output-in-process flag to ON, the output-in-process flag being disposed in the page control table and indicating that the page is being written in the database;

unlocking a buffer pool in which the buffer exists;

writing the updated page from the buffer pool in the database;

setting the output-in-process flag to OFF after the write operation is terminated; and setting the synpoint acquisition flag and the output request flag to OFF, thereby allowing the access request.

5. A database management method according to claim 4, further comprising the steps of:

locking, when usage of the page accessed for the transaction is finished, the buffer pool before the step of checking ON/OFF of the syncpoint acquisition flag;

executing, after the output request flag is set to OFF, a concurrency control process to activate a transaction when an access is made to a page while the page is being written in the database; and locking, yet again, the buffer pool after the concurrency control process is performed.

6. A database system including a computer system having a central processing system (CPU) and a main storage, an external storage having a database and terminals, said computer system further including a database management system which comprises:

means for acquiring a synchronization point (syncpoint) in said database management system for enabling a plurality of transactions to be performed concurrently in which a restart recovery process is assumed at an occurrence of a system failure, said syncpoint assuring a database version on said external storage, said syncpoint being determined at each interval at which database update logs from the transactions are accumulated (incremented) to a given amount, said means comprising:

a buffer and page control tables, an update page control table, mark means for assigning, at the beginning of an acquisition of a syncpoint, a mark indicating that syncpoint acquisition is in process to tables controlling all updated pages in a buffer pool mapped onto said main storage, said buffer pool including a plurality of buffers for storing respective pages, said updated pages not having been written into a database of said external storage, write means for writing, during the syncpoint acquisition, the updated pages for the marked table to the database of said external storage, update and access control means for further updating specific ones of the updated pages for the marked tables during the syncpoint acquisition process, before the specific updated pages are accessed, writing the further updated specific pages to said database, removing the mark from the control table for the further updated specific pages to allow a request of access and to the further updated specific pages, and determining means for determining, in response to termination of a write operation of said database, that the syncpoint acquisition has been completed at the end of the write operation for all updated pages for the marked tables.

7. A database management system according to claim 6, wherein said means for allowing the access request after removal of the mark checks ON/OFF of a syncpoint acquisition flag disposed in the page control table controlling each page in the buffer, said flag indicating that a page is assigned as an output page at syncpoint acquisition; sets, at detection of an event that the flag is ON, an output-in-process flag to ON, said output-in-process flag being disposed in the page control table and indicating that the page is being written in said database; unlocks a buffer pool in which the buffer exists, writes the updated page from the buffer pool in the database, sets the output-in-process flag to OFF after the write operation is terminated, and sets the syncpoint acquisition flag and the output request flag to OFF to thereby allow the access request.

8. A database management system according to claim 6, further comprising a buffer pool control table for controlling a buffer pool reserved in the main storage with correspondences established between the buffer pool and pages having a physically fixed length as a unit of accumulating data in the database, wherein:

said table includes a number of updated pages existing in the buffer table and a deferred write flag indicating that a deferred write operation is being performed by a deferred write processing part;

said flag being responsive to operation of the deferred write processing part writing data updated in the buffer pool to said database in an asynchronous fashion with respect to transactions; and when a number of log output operations reaches a value associated with a syncpoint acquiring point, control is passed to a pre-syncpoint acquiring process in which the buffer pool is locked, the deferred write flag is set to ON, and the buffer pool is unlocked.

9. For a database management system for performing a plurality of transactions concurrently, in which a restart recovery process is assumed at an occurrence of a system failure, a method for acquiring a synchronization point (syncpoint) for assuring a database version on an external storage, said syncpoint being determined at each interval at which database update logs from the transactions are accumulated (incremented) to a given amount, said method comprising the steps of:

assigning, at the beginning of acquisition of a syncpoint, a mark indicating that syncpoint acquisition is in progress to tables controlling all updated pages in a buffer pool mapped onto a main storage, said buffer pool including a plurality of buffers for storing respective pages, said updated pages not having been written into a database of an external storage;

writing, during the syncpoint acquisition, the updated pages for the marked control table to the database of the external storage;

executing a transaction for further updating specific ones of the updated pages for the marked control table during the syncpoint acquisition process, before the updated page or pages are accessed, writing the further updated specific page or pages to said database, removing the mark from the marked control table for the further updated specific pages to allow a request of access to the further updated specific pages;

determining, in response to termination of the write operation to said database, that the syncpoint acquisition is completed at the end of the write operation for all updated pages for the marked tables;

detecting a point of time relative to a previous syncpoint acquiring point when an amount of log data written in a log file reaches a predetermined value;

setting said detected point of time as a pre-syncpoint acquisition point; and asynchronously writing the updated pages in said buffer pool to said external storage of said database during a period of time ranging from the pre-syncpoint acquisition point to the beginning of syncpoint acquisition;

wherein said pre-syncpoint acquisition process comprises the steps of:

determining, at the beginning of syncpoint acquisition, whether or not the pre-syncpoint acquisition is completed;

correcting, when the pre-syncpoint acquisition is not completed, a setting value of the beginning of pre-syncpoint acquisition to a point of time earlier than that indicated by the setting value according to the number of updated pages in the buffer not written in the database; and correcting, when the pre-syncpoint acquisition is completed, a setting value of a start point of presyncpoint acquisition to a point of time delayed as compared with a point of time indicated by the setting value according to the number of updated pages existing in the buffer when the syncpoint acquisition is performed.

10. A database system including a computer system having a central processing system (CPU) and a main storage, an external storage having a database and terminals, said computer system further including a database management system which comprises:

means for acquiring a synchronization point (syncpoint) in said database management system for enabling a plurality of transactions to be performed concurrently in which a restart recovery process is assumed at an occurrence of a system failure, said syncpoint being determined at each interval at which database update logs from the transactions are accumulated (incremented) to a given amount, said means comprising:

a buffer and page control tables, an update page control table, mark means for assigning, at the beginning of an acquisition of a syncpoint, a mark indicating that syncpoint acquisition is in process to tables controlling all updated pages in a buffer pool mapped onto said main storage, said buffer pool including a plurality of buffers for storing respective pages, said updated pages not having been written into a database of said external storage, write means for writing, during the syncpoint acquisition, the updated pages for the marked control table to the database of said external storage, update and access control means for further updating specific ones of the updated pages for the marked control table during the syncpoint acquisition process, before the specific updated pages are accessed, writing the further updated specific pages to said database, removing the mark from the control table for the further updated specific pages to allow a request of access and to the further updated specific pages, and determining means for determining, in response to termination of a write operation of said database, that the syncpoint acquisition has been completed at the end of the write operation for all updated pages for the marked tables; and means for detecting a point of time relative to a previous syncpoint acquiring point when an amount of log data written in a log file reaches a predetermined value, wherein said update and access control means includes a pre-syncpoint processing means for asynchronously writing the updated pages in said buffer pool to said external storage of said database during a period of time ranging from the pre-syncpoint acquisition point to the beginning of syncpoint acquisition.

11. A database management system according to claim 10, further comprising means operative in the pre-syncpoint acquisition process for assigning, at the beginning of syncpoint acquisition for each of the updated pages in the buffer not written in the database before the beginning of syncpoint acquisition, a mark indicating that syncpoint acquisition is in progress to the updated page control table controlling all updated pages in the buffer.

12. A database management system according to claim 10, further comprising for the pre-syncpoint acquisition process:

means operative for storing at the beginning of syncpoint acquisition whether or not the pre-syncpoint acquisition is completed;

means for correcting, when the pre-syncpoint acquisition is not completed, a setting value of the begining of pre-syncpoint acquisition to a point of time earlier than that indicated by the setting value according to the number of updated pages in the buffer not written in said database; and means for correcting, when the pre-syncpoint acquisition is completed, a setting value of the begining of pre-syncpoint acquisition to a point of time delayed as compared with a point of time indicated by the setting value according to the number of updated pages existing in the buffer when the syncpoint acquisition is performed.

13. A database management system according to claim 6, wherein:

said page control table controls buffers and all pages existing in a buffer pool;

said page control table includes a syncpoint acquisition flag indicating that a page related thereto is an output page at syncpoint acquisition and an output request flag; and said syncpoint acquisition flag is set to a syncpoint acquisition state for a page in the buffer pool for which the output request flag is in an output request state and the update page control table is simultaneously generated, thereby controlling the pages to be written in said database during the syncpoint acquisition.

* * * * *